US011904579B2

(12) United States Patent
Oi et al.

(10) Patent No.: US 11,904,579 B2
(45) Date of Patent: Feb. 20, 2024

(54) MOLDED ARTICLE OF POLYPROPYLENE-BASED RESIN FOAMED PARTICLE MOLDED BODY, POLYPROPYLENE-BASED RESIN FOAMED PARTICLE, AND METHOD FOR PRODUCING SAME

(71) Applicant: JSP CORPORATION, Chiyoda-ku (JP)

(72) Inventors: Takashi Oi, Tokyo (JP); Hajime Ohta, Tochigi (JP)

(73) Assignee: JSP CORPORATION, Chiyoda-ku (JP)

(*) Notice: Subject to any disclaimer, the term of this patent is extended or adjusted under 35 U.S.C. 154(b) by 0 days.

(21) Appl. No.: 17/905,890

(22) PCT Filed: Feb. 12, 2021

(86) PCT No.: PCT/JP2021/005217
§ 371 (c)(1),
(2) Date: Sep. 8, 2022

(87) PCT Pub. No.: WO2021/182008
PCT Pub. Date: Sep. 16, 2021

(65) Prior Publication Data

US 2023/0119472 A1 Apr. 20, 2023

(30) Foreign Application Priority Data

Mar. 11, 2020 (JP) ................................ 2020-041447

(51) Int. Cl.
*B32B 27/08* (2006.01)
*B32B 27/32* (2006.01)

(52) U.S. Cl.
CPC .............. *B32B 27/08* (2013.01); *B32B 27/32* (2013.01); *B32B 2250/02* (2013.01); *B32B 2266/025* (2013.01); *B32B 2553/00* (2013.01)

(58) Field of Classification Search
CPC ..... B32B 27/08; B32B 27/32; B32B 2250/02; B32B 2266/025; B32B 2553/00;
(Continued)

(56) References Cited

U.S. PATENT DOCUMENTS 9,079,360 B2 7/2015 Nohara et al.
10,221,292 B2 3/2019 Yoshida et al.
(Continued)

FOREIGN PATENT DOCUMENTS

CN 101948585 A 1/2011
CN 105849167 A 8/2016
(Continued)

OTHER PUBLICATIONS

English translation of Written Opinion dated Apr. 20, 2021 in PCT/JP2021/005217, 3 pages.
(Continued)

*Primary Examiner* — James C Yager
(74) *Attorney, Agent, or Firm* — Oblon, McClelland, Maier & Neustadt, L.L.P.

(57) ABSTRACT

A molded article of polypropylene-based resin expanded beads, obtained by in-mold molding of the polypropylene-based resin expanded beads, each bead including: a core layer, in a foamed state, having a polypropylene-based resin; and a covering layer, which covers the core layer, having a polyethylene-based resin. A molded article magnification X [times] of the molded article is 55 times to 90 times, a value of a product $X \cdot \sigma_{50}$ of a 50% compressive stress $\sigma_{50}$ [kPa]
(Continued)

and the molded article magnification X is 6500 or more, and a 5% compressive stress $\sigma_5$ of the expanded beads molded article is 5 kPa to 25 kPa.

14 Claims, 2 Drawing Sheets

(58) Field of Classification Search
CPC .. C08J 9/122; C08J 2201/034; C08J 2203/06; C08J 2205/044; C08J 2205/052; C08J 2323/14; C08J 2323/16; C08J 2423/06; C08J 9/18; C08J 9/232; B29K 2023/12; B29C 44/3461; B29C 44/44
See application file for complete search history.

(56) References Cited

U.S. PATENT DOCUMENTS

| | | | |
|---|---|---|---|
| 10,336,880 | B2 | 7/2019 | Oikawa et al. |
| 10,487,188 | B2 | 11/2019 | Kitahara et al. |
| 2009/0169895 | A1 | 7/2009 | Nohara et al. |
| 2013/0266792 | A1 | 10/2013 | Nohara et al. |
| 2016/0319095 | A1 | 11/2016 | Yoshida et al. |
| 2017/0218158 | A1 | 8/2017 | Yoshida et al. |
| 2018/0022886 | A1 | 1/2018 | Oikawa et al. |
| 2018/0186959 | A1 | 7/2018 | Yoshida et al. |
| 2018/0215891 | A1 | 8/2018 | Kitahara et al. |

FOREIGN PATENT DOCUMENTS

| | | | |
|---|---|---|---|
| CN | 107108942 | A | 8/2017 |
| JP | 2004-115785 | A | 4/2004 |
| JP | 2011-16914 | A | 1/2011 |
| JP | 2012-126816 | A | 7/2012 |
| JP | 2015-137061 | A | 7/2015 |
| JP | 2017-19980 | A | 1/2017 |
| WO | WO 2016/060162 | A1 | 4/2016 |
| WO | WO 2016/111017 | A1 | 7/2016 |

OTHER PUBLICATIONS

Combined Chinese Office Action and Search Report dated Mar. 11, 2023 in Patent Application No. 202180009566.9 (with English machine translation), citing documents 15-17 therein, 12 pages.
Extended European Search Report dated Jun. 21, 2023 in European Patent Application No. 21768157.6, citing document 1 therein, 8 pages.
International Search Report dated Apr. 20, 2021 in PCT/JP2021/005217 filed on Feb. 12, 2021 (citing references 1-9 & 16-21 therein, 3 pages).

MOLDED ARTICLE OF POLYPROPYLENE-BASED RESIN FOAMED PARTICLE MOLDED BODY, POLYPROPYLENE-BASED RESIN FOAMED PARTICLE, AND METHOD FOR PRODUCING SAME

CROSS-REFERENCE TO RELATED APPLICATIONS

The present application is a 35 U.S.C. § 371 national stage application of International patent application PCT/JP2021/005217, filed Feb. 12, 2021, which is based on and claims the priority to Japanese Application No. 2020-041447, filed Mar. 11, 2020. The entire contents of these applications are incorporated herein by reference.

TECHNICAL FIELD

The present invention relates to a molded article of polypropylene-based resin expanded beads, polypropylene-based resin expanded beads, and a method for producing the same.

BACKGROUND ART

An expanded bead molded article obtained by in-mold molding expanded beads is suitably used as a cushioning material or a packaging material for protecting an object to be packaged. As this type of expanded bead molded article, for example, an expanded bead molded article formed of polypropylene-based resin expanded beads is used (for example, Patent Document 1). As an expanded bead molded article more excellent in protective properties for an object to be packaged than the molded article of polypropylene-based resin expanded beads, an expanded bead molded article formed of polyethylene-based resin expanded bead s may be used.

PRIOR ART LITERATURE

Patent Documents

Patent Document 1: JP-A-2011-16914

SUMMARY OF THE INVENTION

Problems to be Solved by the Invention

However, when a molded article of polypropylene-based resin expanded beads is used as a cushioning material or a packaging material for protecting an object to be packaged, the protective properties are insufficient depending on the type of the object to be packaged in some cases. On the other hand, in the case where a molded article of polyethylene-based resin expanded beads is used as a cushioning material or a packaging material for protecting an object to be packaged, a mass per unit volume tends to be large when intending to achieve rigidity required for the cushioning material or the like. In this case, there have occurred problems such that the rigidity is likely to be insufficient, the expanded bead molded article is easily bent by its own weight, and the expanded bead molded article is easily deformed by a mass of the object to be packaged.

The present invention has been made in view of such a background, and an object of the present invention is to provide a molded article of polypropylene-based resin expanded beads which is excellent in protective properties for an object to be packaged and rigidity and has a small mass per unit volume, a polypropylene-based resin expanded bead capable of forming the expanded beads molded article, and a method for producing the same.

Means for Solving the Problems

One aspect of the present invention is a molded article of polypropylene-based resin expanded beads that is obtained by in-mold molding the polypropylene-based resin expanded beads, the polypropylene-based resin expanded bead including: a core layer, in a foamed state, containing a polypropylene-based resin; and a covering layer, which covers the core layer, containing a polyethylene-based resin, wherein, a molded article magnification X [times] of the molded article is 55 times or more and 90 times or less,

- a value of a product $X \cdot \sigma_{50}$ of a 50% compressive stress $\sigma_{50}$ [kPa] and the molded article magnification X in the molded article is 6500 or more, and
- a 5% compressive stress $\sigma_5$ of the molded article is 5 kPa or more and 25 kPa or less.

Another aspect of the present invention is a polypropylene-based resin expanded bead including:

- a core layer, in a foamed state, containing a polypropylene-based resin; and
- a covering layer, which covers the core layer, containing a polyethylene-based resin, wherein
- a bulk ratio is 55 times or more and 90 times or less,
- a mass ratio between the core layer and the covering layer is the core layer: the covering layer=95:5 to 88:12,
- a flexural modulus Mc of the polypropylene-based resin contained in the core layer is 800 MPa or more and 1200 MPa or less, and
- a flexural modulus Ms of the polyethylene-based resin contained in the covering layer is 250 MPa or less.

Still another aspect of the present invention is a method for producing a polypropylene-based resin expanded bead, including:

- a granulating step of forming a polypropylene-based resin bead including: a core layer, in a non-foamed state, containing a polypropylene-based resin having a flexural modulus Mc of 800 MPa or more and 1200 MPa or more; and a covering layer, which covers the core layer, containing a polyethylene-based resin having a flexural modulus Ms of 250 MPa or less, wherein a mass ratio between the core layer to the covering layer is the core layer:the covering layer=95:5 to 88:12;
- a first expanding step of impregnating the polypropylene-based resin bead dispersed in a dispersion medium in a sealed container with an inorganic physical blowing agent, and then releasing the polypropylene-based resin bead and the dispersion medium from the sealed container to a pressure lower than that in the sealed container, thereby obtaining a first-step expanded bead including: a core layer, in a foamed state, containing the polypropylene-based resin; and a covering layer, which covers the core layer, containing the polyethylene-based resin; and
- a second expanding step of impregnating the first-step expanded bead with an inorganic gas in a pressure-resistant container to increase a pressure in cells of the first-step expanded bead, and then heating the first-step expanded bead taken out from the pressure-resistant container under a pressure lower than that in the cells to further expand the first-step expanded bead, thereby obtaining a polypropylene-based resin expanded bead having a bulk ratio (II) of 55 times or more and 90 times or less.

Effects of the Invention

The molded article of polypropylene-based resin expanded beads (hereinafter, abbreviated as "expanded beads molded article in some cases") is composed of a polypropylene-based resin expanded bead (hereinafter, sometimes abbreviated as "expanded bead") including: a core layer, in a foamed state, containing a polypropylene-based resin; and a covering layer containing a polyethylene-based resin and covering the core layer. Because of the expanded beads molded article having the core layer containing a polypropylene-based resin, the molded article magnification X can be increased with ensured rigidity. Therefore, the expanded beads molded article can be easily provided with both high rigidity and lightness in weight.

Further, in the expanded beads molded article, a product of the molded article magnification X and the 50% compressive stress $\sigma_{50}$ satisfies the specific relationship described above, and a value of the 5% compressive stress $\sigma_5$ falls within the specific range described above. The molded article of polypropylene-based resin expanded beads having such physical properties possesses high rigidity and excellent protective properties for an object to be packaged.

As described above, according to the above aspects, it is possible to obtain a molded article of polypropylene-based resin expanded beads which is excellent in protective properties for an object to be packaged and rigidity, and of which the mass per unit volume is small.

Figure 1:
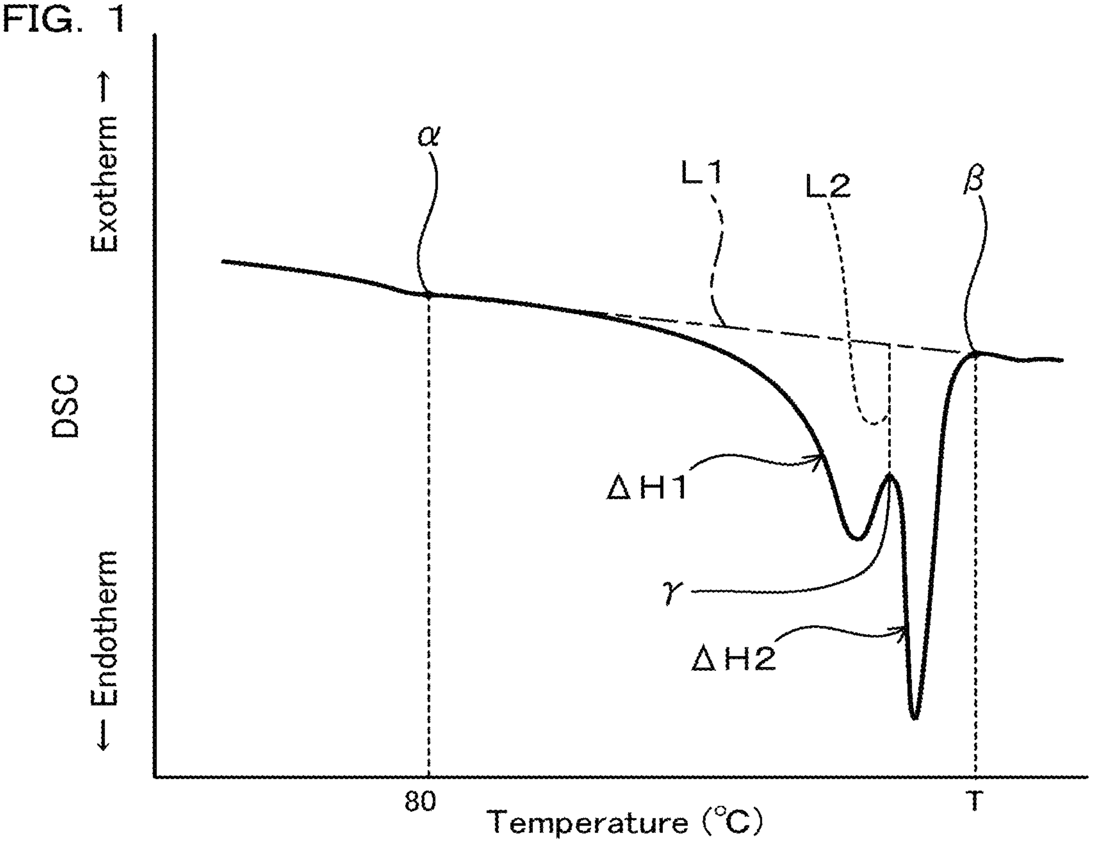
FIG. 1 is an explanatory diagram illustrating a method of calculating an area of a high temperature peak.

MODES FOR CARRYING OUT THE INVENTION (Expanded Beads Molded Article)

The expanded beads molded article is composed of polypropylene-based resin expanded beads including: a core layer, in a foamed state, containing a polypropylene-based resin; and a covering layer containing a polyethylene-based resin and covering the core layer. It is noted that in the present specification, "A to B" representing a numerical range is synonymous with as "A or more and B or less", and represents a numerical range in which A and B that are end points of the numerical range are inclusive.

<Expanded Bead>

The polyethylene-based resin contained in the covering layer of the expanded beads preferably has a flexural modulus Ms of 250 MPa or less. By adopting such a polyethylene-based resin in the covering layer, the 5% compressive stress $\sigma_5$ of the expanded beads molded article can be further reduced, and a texture gentler to the object to be packaged can be imparted to a skin surface of the expanded beads molded article, that is, a surface in contact with an inner surface of a mold during in-mold molding. As a result, the protective properties of the expanded beads molded article can be further improved.

The polypropylene-based resin contained in the core layer of the expanded bead preferably has a flexural modulus Mc of 800 MPa or more and 1200 MPa or less. By adopting such a polypropylene-based resin in the core layer, the molded article magnification X can be increased with the rigidity of the expanded beads molded article being maintained.

A more specific configuration of the expanded bead used in the expanded beads molded article will be described later.

<Molded Article Magnification, 50% Compressive Stress, and 5% Compressive Stress>

The expanded beads molded article has a molded article magnification X [times] of 55 times or more and 90 times or less, a value of a product $X \cdot \sigma_{50}$ of a 50% compressive stress $\sigma_{50}$ [kPa] and the molded article magnification X of 6500 or more, and a 5% compressive stress $\sigma_5$ of 5 kPa or more and 25 kPa or less. In the expanded beads molded article, the three physical property values of the molded article magnification X, the 50% compressive stress $\sigma_{50}$, and the 5% compressive stress $\sigma_5$ satisfy the above relationship, so that the expanded beads molded article can have excellent protective properties and can have both high rigidity and lightness in weight.

When the molded article magnification X of the expanded beads molded article is too small, a mass per unit volume of the expanded beads molded article tends to be large. In this case, the expanded beads molded article may be easily bent due to its own weight. In addition, the protective properties for the object to be packaged may be deteriorated.

The molded article magnification X of the expanded beads molded article is preferably 58 times or more, more preferably 60 times or more, still more preferably 62 times or more, and particularly preferably 65 times or more. In this case, it is possible to further improve the protective properties for the object to be packaged while securing the rigidity of the expanded beads molded article. In addition, the mass per unit volume of the expanded beads molded article can be further reduced. From the viewpoint of further improving the rigidity of the expanded beads molded article, the molded article magnification X of the expanded beads molded article is preferably 85 times or less, and more preferably 80 times or less.

The molded article magnification X [times] of the expanded beads molded article described above is a value obtained by dividing a density [$kg/m^3$] of the polypropylene-based resin contained in the core layer by a molded article density $\rho(D)$ [$kg/m^3$] of the expanded beads molded article. The density of the polypropylene-based resin contained in the core layer can be determined, for example, by a method described in JIS K 7112: 1999. The density of the polypropylene-based resin contained in the core layer is approximately 890 $kg/m^3$ or more and 910 $kg/m^3$ or less.

The molded article density $\rho(D)$ of the expanded beads molded article is a value as calculated by the following method. First, a measurement sample is collected from the vicinity of a center part of the expanded beads molded article. A value obtained by dividing a mass of the measurement sample by a volume of the measurement sample as calculated based on dimensions is defined as molded article density $\rho(D)$ of the expanded beads molded article. The center part of the expanded beads molded article described above refers to a portion farthest from all the skin surfaces present in the expanded beads molded article. In the in-mold molding of the expanded beads molded article, secondary expansion of the expanded beads present in the vicinity of the skin surfaces is regulated by a mold. By collecting the measurement sample from the vicinity of the center part of the expanded beads molded article, it is possible to avoid influence of portions in the vicinity of the skin surfaces on the measurement of the molded article magnification.

The value of the product $X \cdot \sigma_{50}$ of the 50% compressive stress $\sigma_{50}$ and the molded article magnification X is an index related to a balance between the lightness in weight and the rigidity of the expanded beads molded article. The rigidity of the expanded beads molded article tends to increase as the 50% compressive stress $\sigma_{50}$ increases. The mass per unit volume of the expanded beads molded article decreases as the molded article magnification X of the expanded beads molded article increases. When the expanded beads molded article has a value of the product $X \cdot \sigma_{50}$ of the 50% compressive stress $\sigma_{50}$ and the molded article magnification X of 6500 or more, the rigidity and the lightness in weight of the expanded beads molded article can be improved in a well-balanced manner. According to such an expanded beads molded article, bending due to its own weight can be reduced, and deformation and damage of the expanded beads molded article due to the object to be packaged can be suppressed, even when the mass of the object to be packaged is relatively large.

In the expanded beads molded article having a small value of the product $X \cdot \sigma_{50}$ of the 50% compressive stress $\sigma_{50}$ and the molded article magnification X, at least one of the 50% compressive stress $\sigma_{50}$ and the molded article magnification X is small. Therefore, in this case, a problem, such as an increase in mass per unit volume of the expanded beads molded article or a decrease in rigidity of the expanded beads molded article, may easily occur.

From the viewpoint of further improving the rigidity and the lightness in weight, the value of the product $X \cdot \sigma_{50}$ of the 50% compressive stress $\sigma_{501}$ and the molded article magnification X is preferably 7000 or more, and more preferably 7500 or more. From the above viewpoint, there is no upper limit on the value of the product $X \cdot \sigma_{50}$ of the 50% compressive stress $\sigma_{50}$ and the molded article magnification X, but, considering the components of the expanded beads molded article, the value of the product $X \cdot \sigma_{50}$ of the 50% compressive stress $\sigma_{50}$ and the molded article magnification X is usually 9000 or less.

The 5% compressive stress $\sigma_5$ of the expanded beads molded article is 5 kPa or more and 25 kPa or less. By setting the 5% compressive stress $\sigma_5$ within the above-described specific range, it is possible to enhance the protective properties for the object to be packaged. In this case, it is possible to enhance restorability of the expanded beads molded article, and to easily restore a shape of the surface of the expanded beads molded article to the shape before compression when the surface is compressed. If the 5% compressive stress $\sigma_5$ is too high, the protective properties for the object to be packaged may be impaired. In addition, when the 5% compressive stress $\sigma_5$ is too low, the surface of the expanded beads molded article becomes too soft, and there is a possibility that breakage or the like is likely to occur. From the viewpoint of more reliably avoiding these problems and further enhancing the protective properties and the restorability of the expanded beads molded article, the 5% compressive stress $\sigma_5$ is preferably 15 kPa or more and 24 kPa or less.

Since the value of the 5% compressive stress $\sigma_5$ tends to be large in a conventional molded article of polypropylene-based resin expanded beads, the protective properties may be poor depending on the application. In addition, when the molded article magnification X is simply increased in order to decrease the value of the 5% compressive stress $\sigma_5$, the value of the 50% compressive stress $\sigma_{50}$ tends to decrease, and there is a possibility that the rigidity of the expanded beads molded article cannot be maintained.

On the other hand, in the expanded beads molded article, while the rigidity of the expanded beads molded article is maintained by setting the value of the product $X \cdot \sigma_{50}$ of the 50% compressive stress $\sigma_{50}$ and the molded article magnification X to 6500 or more, the value of the 5% compressive stress $\sigma_5$ can be reduced as compared with that of the conventional molded article of polypropylene-based resin expanded beads. Therefore, the surface of the expanded beads molded article can be made soft even though the expanded beads molded article is composed of expanded beads containing a polypropylene-based resin, and, when an impact is applied to the object to be packaged, the surface of the expanded beads molded article is easily deformed following the object to be packaged. As a result, it is possible to realize excellent protective properties equal to or higher than those of the polyethylene-based resin expanded beads molded article.

A value of a ratio $\sigma_5/\sigma_{50}$ of the 5% compressive stress $\sigma_5$ [kPa] to the 50% compressive stress $\sigma_{50}$ in the expanded beads molded article is preferably 0.20 or less, and more preferably 0.19 or less. The value of the ratio $\sigma_5/\sigma_{50}$ of the 5% compressive stress $\sigma_5$ to the 50% compressive stress $\sigma_{50}$ is an index related to the balance between the protective properties and the rigidity of the object to be packaged. The expanded beads molded article can have a smaller value of $\sigma_5/\sigma_{50}$ than that of the conventional molded article of polypropylene-based resin expanded beads. Therefore, the surface of the expanded beads molded article can be made softer even though the expanded beads molded article is composed of expanded beads containing a polypropylene-based resin, and, when an impact is applied to the object to be packaged, the surface of the expanded beads molded article is easily deformed following the object to be packaged.

Furthermore, the 50% compressive stress $\sigma_{50}$ of the expanded beads molded article is sufficiently large as compared with that of the 5% compressive stress $\sigma_5$, and thus it is possible to further enhance the rigidity of the expanded beads molded article while making the surface more flexible. Therefore, the expanded beads molded article can have excellent rigidity, and more reliably realize excellent protective properties equal to or higher than those of the polyethylene-based resin expanded beads molded article.

From the viewpoint of achieving both high rigidity and excellent protective properties, there is no lower limit on the value of the ratio $\sigma_5/\sigma_{50}$ of the 5% compressive stress $\sigma_5$ to the 50% compressive stress $\sigma_{50}$. However, considering the components of the expanded beads molded article, the value of the ratio $\sigma_5/\sigma_{50}$ of the 5% compressive stress as to the 50% compressive stress $\sigma_{50}$ is usually 0.15 or more.

The 50% compressive stress $\sigma_{50}$ of the expanded beads molded article is preferably 80 kPa or more and 150 kPa or less, and more preferably 100 kPa or more and 140 kPa or less. In this case, it is possible to more reliably realize rigidity suitable for use as a cushioning material or a packaging material while securing the protective properties for the object to be packaged.

The values of the 50% compressive stress $\sigma_{50}$ and the 5% compressive stress $\sigma_5$ of the expanded beads molded article can be measured by a method prescribed in JIS K 6767: 1999.

A ratio $\rho(E)/\rho(D)$ of an apparent density $\rho(E)$ in the surface layer part of the expanded beads molded article to the molded article density ρ(D) of the expanded beads molded article is preferably 1.1 or more and 1.6 or less, and more preferably 1.2 or more and 1.5 or less. In this case, it is possible to further improve the protective properties for the object to be packaged when the expanded beads molded article is used as a cushioning material or a packaging material.

In the present specification, the surface layer part of the expanded beads molded article refers to a region between the skin surfaces of the expanded beads molded article and a surface having a depth of 3 mm from the skin surfaces. The apparent density ρ(E) in the surface layer part of the expanded beads molded article can be determined by the following method. First, the expanded beads molded article is cut at the surface having a depth of 3 mm from the skin surface, and the surface layer part is collected. Next, the surface layer part is cut into an appropriate size, and a small piece in which one surface in the thickness direction is the skin surface is collected. The small piece is allowed to stand in an environment of a temperature of 23° C. and a relative humidity of 50% RH for one day, and then the mass of the small piece is measured. The apparent density ρ(E) [$kg/m^3$] in the surface layer part can be determined by dividing the mass of the small piece by the volume calculated based on the outer diameter dimension of the small piece.

An average cell diameter $d_i$ in an inner part of the expanded beads molded article is preferably 80 μm or more and 170 μm or less. By setting the average cell diameter $d_i$ in the inner part of the expanded beads molded article within the above-described specific range, the 5% compressive stress $\sigma_5$ of the expanded beads molded article can be more easily reduced. As a result, the protective properties of the expanded beads molded article can be further improved. In addition, also when the expanded beads molded article is sliced and used, the desired physical properties can be more reliably exhibited. From the viewpoint of further improving the protective properties of the expanded beads molded article, the average cell diameter $d_i$ in the inner part of the expanded beads molded article is more preferably 100 μm or more and 165 μm or less, still more preferably 120 μm or more and 160 μm or less, and particularly preferably 130 μm or more and 150 μm or less.

The average cell diameter $d_i$ in the inner part of the expanded beads molded article is a value as calculated by the following method. First, a cuboid small piece having no skin surface is cut out from the vicinity of the center part of the expanded beads molded article.

An enlarged photograph of a surface parallel to the thickness direction of the small piece is acquired using a scanning electron microscope. At this time, the enlarged photograph is obtained such that 20 or more cells are present in the enlarged photograph. A line segment passing through the center in the thickness direction is drawn on the obtained enlarged photograph, and a number of cells intersecting the line segment is counted. Then, a value obtained by dividing a length of the line segment by the number of cells intersecting the line segment is defined as average cell diameter $d_i$ [μm] in the inner part of the expanded beads molded article.

A ratio $d_s/d_i$ of an average cell diameter $d_s$ [μm] of the surface layer part of the expanded beads molded article to the average cell diameter $d_i$ in the inner part of the expanded beads molded article is preferably 0.80 or more and 1.20 or less. By reducing a difference between the average cell diameter $d_s$ of the surface layer part of the expanded beads molded article and the average cell diameter $d_i$ in the inner part of the expanded beads molded article in this way, a manner of cell collapse in the surface layer part of the expanded beads molded article can be made closer to a manner of cell collapse in the inner part thereof, when the expanded beads molded article is compressed. Thus, variations in physical properties of the expanded beads molded article can be further reduced, and, therefore, the protective properties of the expanded beads molded article can be further improved.

From the viewpoint of more reliably providing the above-described operational effects, the ratio $d_s/d_i$ of the average cell diameter $d_s$ [μm] of the surface layer part to the average cell diameter $d_i$ in the inner part of the expanded beads molded article is more preferably 0.85 or more and 1.18 or less, still more preferably 0.90 or more and 1.15 or less, and particularly preferably 1.00 or more and 1.12 or less.

The average cell diameter $d_s$ in the surface layer part of the expanded beads molded article is a value as calculated by the following method. First, a substantially cubic small piece is collected from the surface layer part of the expanded beads molded article. An enlarged photograph of a surface parallel to the thickness direction of the small piece is acquired using a scanning electron microscope. At this time, the enlarged photograph is obtained such that 20 or more cells are present in the enlarged photograph. On the obtained enlarged photograph, a line segment parallel to the skin surfaces is drawn such that the depth (that is, a distance in the thickness direction) from the skin surface is 50 μm, and the number of cells intersecting the line segment is counted. Then, a value obtained by dividing a length of the line segment by the number of cells intersecting the line segment is defined as average cell diameter $d_s$ [μm] in the surface layer part of the expanded beads molded article.

The average cell diameter $d_s$ in the surface layer part of the expanded beads molded article is preferably 80 μm or more and 200 μm or less, more preferably 110 μm or more and 180 μm or less, and still more preferably 140 μm or more and 160 μm or less. In this case, the shape restorability when the surface of the expanded beads molded article is compressed can be further enhanced, and the protective properties for the object to be packaged can be further improved.

(Method for Producing Expanded Beads Molded Article)

The expanded beads molded article is produced, for example, as follows. First, expanded beads are filled in a mold having a cavity corresponding to a desired shape of a molded article, and a large number of expanded beads are heated in the mold by a heating medium such as steam. The expanded beads in the cavity further expand by heating, and are fused to each other. As a result, a large number of expanded beads are integrated, so that a expanded beads molded article according to the shape of the cavity is obtained.

(Expanded Bead)

The polypropylene-based resin expanded bead used for forming the expanded beads molded article may have the following configuration. Specifically, the expanded bead includes:

a core layer, in a foamed state, containing a polypropylene-based resin; and a covering layer, which covers the core layer, containing a polyethylene-based resin, wherein a bulk ratio is 55 times or more and 90 times or less, wherein a mass ratio between the core layer and the covering layer is the core layer:the covering layer=95:5 to 88:12, wherein a flexural modulus Mc of the polypropylene-based resin contained in the core layer is 800 MPa or more and 1200 MPa or less, and wherein a flexural modulus Ms of the polyethylene-based resin contained in the covering layer is 250 MPa or less.

The expanded beads molded article can be easily obtained by in-mold molding the expanded beads having the above-described configuration.

<Core Layer>

The core layer of the expanded beads is composed of a foam containing a polypropylene-based resin. In the present specification, the polypropylene-based resin refers to a homopolymer of a propylene monomer and a propylene-based copolymer containing 50 mass % or more of a structural unit derived from propylene. The core layer may contain one polypropylene-based resin selected from the group consisting of homopolymers of propylene monomers and propylene-based copolymers, or may contain two or more polypropylene-based resins.

Examples of the homopolymer of the propylene monomer include isotactic polypropylene, syndiotactic polypropylene, and atactic polypropylene.

As the propylene-based copolymer, for example, a copolymer of propylene and an α-olefin having 4 to 10 carbon atoms such as ethylene, 1-butene, isobutylene, 1-pentene, 3-methyl-1 butene, 1-hexene, 3,4-dimethyl-1 butene, or 3-methyl-1 hexene, a propylene-acrylic acid copolymer, a propylene-maleic anhydride copolymer, or the like can be used. These copolymers may be random copolymers or block copolymers. In addition, the copolymer may be a binary copolymer or a ternary or higher multicomponent copolymer. A content of the structural unit other than the structural unit derived from propylene in the copolymer is preferably 25 mass % or less, more preferably 15 mass % or less, and still more preferably 10 mass % or less.

The core layer may contain additives such as a cell adjusting agent, a catalyst neutralizing agent, a lubricant, a crystal nucleating agent, and an antistatic agent. A content of the additive in the core layer is, for example, preferably 15 mass % or less, more preferably 10 mass % or less, still more preferably 5 mass % or less, and particularly preferably 1 mass % or less with respect to a total mass of the core layer.

By adding an antistatic agent to the core layer, an antistatic effect can be imparted to the inside of the expanded beads. Therefore, for example, also when the expanded beads are cut after in-mold molding and used, it is possible to obtain a expanded beads molded article in which the entire expanded beads molded article has an antistatic effect.

In addition to the polypropylene-based resin, the core layer may contain a material other than the polypropylene-based resin, such as another resin or an elastomer, as long as neither the object nor the operational effect of the present invention are impaired. Examples of the resin other than the polypropylene-based resin include thermoplastic resins such as a polyethylene-based resin, a polystyrene-based resin, a polybutene-based resin, a polyamide-based resin, and a polyester-based resin. Examples of the elastomer other than the polypropylene-based resin include an olefin-based thermoplastic elastomer and a styrene-based thermoplastic elastomer. A content of the resin, the elastomer, or the like other than the polypropylene-based resin in the core layer is preferably 20 mass % or less, more preferably 10 mass % or less, and particularly preferably 0 mass % (i.e., the core layer does not contain the resin, the elastomer, or the like other than the polypropylene-based resin) with respect to the total mass of the core layer.

The polypropylene-based resin contained in the core layer of the expanded bead has a flexural modulus Mc of 800 MPa or more and 1200 MPa or less. By in-mold molding such expanded beads, it is possible to further increase the molded article magnification while securing the rigidity of the expanded beads molded article, and an expanded beads molded article that is lightweight and excellent in rigidity can be easily obtained. The flexural modulus of the polypropylene-based resin can be determined by measurement in accordance with a measurement method described in JIS K 7171: 2008.

A melting point of the polypropylene-based resin contained in the core layer is preferably 135° C. or higher and 150° C. or lower. In this case, a bulk density of the expanded beads can be more easily reduced. In this case, the 5% compressive stress $\sigma_5$ of the expanded beads molded article obtained by in-mold molding the expanded beads can be further reduced. From the same viewpoint, the melting point of the polypropylene-based resin contained in the core layer is more preferably 138° C. or higher and 148° C. or lower, still more preferably 140° C. or higher and 145° C. or lower.

The melting point of the polypropylene-based resin contained in the core layer can be measured by heat flux differential scanning calorimetry described in JIS K 7121: 1987. Specifically, first, a condition of a test piece made of the polypropylene-based resin is adjusted. Thereafter, the temperature is raised from 23° C. to 200° C. at a temperature raising rate of 10° C./min, and then lowered to 23° C. at a cooling rate of 10° C./min. Thereafter, a top temperature of an endothermic peak determined by a DSC curve obtained when the temperature is raised again from 23° C. to 200° C. at a temperature raising rate of 10° C./min can be defined as melting point of the polypropylene-based resin contained in the core layer. When a plurality of endothermic peaks appears in the DSC curve, the top temperature of the endothermic peak having the largest area is defined as the melting point. The test piece may be collected directly from the core layer by removing the covering layer from the surfaces of the expanded beads to expose the core layer.

A melt flow rate (hereinafter referred to as "MFR") of the polypropylene-based resin contained in the core layer is preferably 2 g/10 min or more and 18 g/10 min or less, more preferably 4 g/10 min or more and 12 g/10 min or more, and still more preferably 6 g/10 min or more and 10 g/10 min or less. In this case, it is possible to further improve the expandability in a process of producing the expanded beads and during in-mold molding. In this case, the bulk density of the expanded beads can be more easily reduced, and the bulk density can be more easily controlled in the process of producing the expanded beads.

The MFR of the polypropylene-based resin described above is a value as measured under conditions of a temperature of 230° C. and a load of 2.16 kg in accordance with JIS K 7210-1: 2014.

A degree of polydispersion Mw/Mn of the polypropylene-based resin contained in the core layer is preferably 4.0 or more and 25 or less, and more preferably 4.1 or more and 10 or less. In this case, it is possible to further improve the expandability in a process of producing the expanded beads and during in-mold molding. In this case, the bulk density of the expanded beads can be more easily reduced, and the bulk density can be more easily controlled in the process of producing the expanded beads. Furthermore, moldability of the expanded beads can be further improved.

The degree of polydispersion Mw/Mn of the polypropylene-based resin is a value obtained by dividing a weight average molecular weight Mw measured by gel permeation chromatography (GPC) using polystyrene as a standard substance by a number average molecular weight Mn.

The polypropylene-based resin contained in the core layer is preferably a polypropylene-based resin obtained by polymerization in the presence of a Ziegler-Natta polymerization catalyst. The polypropylene-based resin produced using the Ziegler-Natta polymerization catalyst tends to have a wider molecular weight distribution than that of a polypropylene-based resin produced using a metallocene catalyst. Therefore, the degree of polydispersion Mw/Mn of the polypropylene-based resin produced using the Ziegler-Natta polymerization catalyst is apt to fall within the above range. Therefore, in this case, it is possible to further improve the expandability in a process of producing the expanded beads and during in-mold molding.

From the viewpoint of further improving the expandability in the process of producing the expanded beads and during in-mold molding, the MFR of the polypropylene-based resin contained in the core layer is more preferably 6 g/10 min or more and 10 g/10 min or less, and the degree of polydispersion Mw/Mn is more preferably 4 or more and 25 or less.

<Covering Layer>

The surface of the core layer is covered with a covering layer containing a polyethylene-based resin. The covering layer may cover the entire core layer or a part of the core layer. The covering layer may be in a foamed state or a non-foamed state. From the viewpoint of more reliably improving fusion bondability of the expanded beads, the covering layer is preferably in a non-foamed state.

As the polyethylene-based resin contained in the covering layer, polyethylene-based resins polymerized using various polymerization catalysts can be used. The polyethylene-based resin contained in the covering layer is preferably a polyethylene-based resin obtained by polymerization in the presence of a metallocene-based polymerization catalyst. Such a polyethylene-based resin has a low melting point and is more excellent in fusion bondability, so that the fusion bondability of the expanded beads can be further improved.

In the present specification, the polyethylene-based resin refers to a homopolymer of an ethylene monomer and an ethylene-based copolymer containing 50 mass % or more of a structural unit derived from an ethylene monomer. The covering layer may contain one polyethylene-based resin selected from the group consisting of homopolymers of ethylene monomers and ethylene-based copolymers, or may contain two or more polyethylene-based resins.

As the polyethylene-based resin, for example, linear low density polyethylene, branched low density polyethylene, high density polyethylene, an ethylene-vinyl acetate copolymer, an ethylene-acrylic acid copolymer, an ethylene-acrylic acid alkyl ester copolymer, an ethylene-methacrylic acid copolymer, an ethylene-methacrylic acid alkyl ester copolymer, or the like can be used.

The covering layer preferably contains linear low density polyethylene as the polyethylene-based resin. In this case, a texture gentler to the object to be packaged can be imparted to the skin surface of the expanded beads molded article. As a result, the protective properties of the expanded beads molded article can be further improved. From the viewpoint of further enhancing such operational effects, a ratio of the linear low density polyethylene in the polyethylene-based resin is preferably 80 mass % or more, more preferably 90 mass % or more, and particularly preferably 100 mass % (i.e., the polyethylene-based resin is composed of the linear low density polyethylene).

The linear low density polyethylene described above refers to a copolymer, having a linear shape, of ethylene and an α-olefin. Specifically, preferred examples of the copolymer include an ethylene-butene copolymer, an ethylene-hexene copolymer, and an ethylene-octene copolymer.

The covering layer may contain additives such as a catalyst neutralizing agent, a lubricant, a crystal nucleating agent, and an antistatic agent. A content of the additive in the covering layer is preferably 15 mass % or less, more preferably 10 mass % or less, still more preferably 5 mass % or less, and particularly preferably 1 mass % or less with respect to a total mass of the covering layer. In particular, from the viewpoint of imparting a texture gentler to the object to be packaged, a content of a polymeric antistatic agent in the covering layer is preferably 5 mass % or less with respect to the total mass of the covering layer.

In addition to the polyethylene-based resin, the covering layer may contain a material other than the polyethylene-based resin, such as another resin or an elastomer, as long as neither the object nor the operational effect of the present invention are impaired. Examples of the resin other than the polyethylene-based resin include thermoplastic resins such as a polypropylene-based resin, a polystyrene-based resin, a polybutene-based resin, a polyamide-based resin, and a polyester-based resin. Examples of the elastomer other than the polyethylene-based resin include an olefin-based thermoplastic elastomer and a styrene-based thermoplastic elastomer. A content of the resin, the elastomer, or the like other than the polyethylene-based resin in the covering layer is preferably 20 mass % or less, more preferably 10 mass % or less, and particularly preferably 0 mass % (i.e., the covering layer does not contain the resin, the elastomer, or the like other than the polyethylene-based resin) with respect to the total mass of the covering layer.

The polyethylene-based resin contained in the covering layer has a flexural modulus Ms of 250 MPa or less. By in-mold molding such expanded beads, it is possible to easily obtain an expanded beads molded article in which the values of the product $X \cdot \sigma_{50}$ of the molded article magnification X and the 50% compressive stress $\sigma_{50}$ and the 5% compressive stress $\sigma_5$ fall within the above-described specific ranges. In addition, it is possible to impart a texture gentler to the object to be packaged to the skin surface of the expanded beads molded article to be obtained, and to further enhance the protective properties of the expanded beads molded article, in spite of the high flexural modulus Mc of the polypropylene-based resin contained in the core layer.

From the viewpoint of more reliably providing these operational effects, the flexural modulus Ms of the polyethylene-based resin contained in the covering layer is preferably 200 MPa or less, and more preferably 150 MPa or less. A lower limit on the flexural modulus Ms of the polyethylene-based resin contained in the covering layer is not particularly limited, but is about 80 MPa or more. The flexural modulus of the polyethylene-based resin can be determined by measurement in accordance with the measurement method described in JIS K 7171: 2008.

A ratio Ms/Mc of the flexural modulus Ms of the polyethylene-based resin contained in the covering layer to the flexural modulus Mc of the polypropylene-based resin contained in the core layer is preferably 0.05 or more and 0.20 or less, and more preferably 0.08 or more and 0.15 or less. In this case, it is possible to more reliably improve the protective properties for the object to be packaged while sufficiently securing the rigidity of the expanded beads molded article. For the same reason, a difference Mc-Ms between the flexural modulus Mc of the polypropylene-based resin contained in the core layer and the flexural modulus Ms of the polyethylene-based resin contained in the covering layer is preferably 400 MPa or more, more preferably 600 MPa or more, and still more preferably 800 MPa or more. An upper limit on the difference Mc-Ms is 950 MPa.

The polyethylene-based resin contained in the covering layer preferably has a melting point lower than that of the polypropylene-based resin contained in the core layer. In this case, the in-mold moldability of the expanded beads can be further improved. From the viewpoint of more reliably providing such operational effects, a value obtained by subtracting the melting point of the polyethylene-based resin contained in the covering layer from the melting point of the polypropylene-based resin contained in the core layer is more preferably 10° C. or higher, still more preferably 20° C. or higher, particularly preferably 30° C. or higher, and most preferably 35° C. or higher.

The polyethylene-based resin contained in the covering layer has a melting point of preferably 120° C. or lower, more preferably 115° C. or lower, and still more preferably 110° C. or lower. By setting the melting point of the polyethylene-based resin to 120° C. or lower, the in-mold moldability of the expanded beads can be further improved. By performing in-mold molding using such expanded beads, a molding pressure during in-mold molding can be further reduced. As a result, collapse of the cells presents on the surface of the expanded beads molded article can be more effectively suppressed, and the protective properties for the object to be packaged can be further improved. In addition, it is possible to more easily obtain an expanded beads molded article having a texture gentler to the object to be packaged.

The melting point of the polyethylene-based resin contained in the covering layer can be measured by the same method as that of the polypropylene-based resin contained in the core layer described above. As the test piece, a small piece made of the polyethylene-based resin may be used, or a small piece mainly including the covering layer, collected from the surfaces of the expanded beads, may be used.

From the viewpoint of further improving the moldability of the expanded beads and the protective properties of the expanded beads molded article to be obtained, the polyethylene-based resin contained in the covering layer preferably has a flexural modulus Ms of 200 MPa or less and a melting point of 120° C. or lower.

A melt flow rate (MFR) of the polyethylene-based resin contained in the covering layer is preferably 6 g/10 min or more and 18 g/10 min or less, and more preferably 8 g/10 min or more and 15 g/10 min or less. When the MFR of the polyethylene-based resin contained in the covering layer falls within the above range, the core layer can be more uniformly covered with the covering layer. As a result, the protective properties can be more reliably improved on the entire surface of the resulting expanded beads molded article.

The MFR of the polyethylene-based resin described above is a value as measured under conditions of a temperature of 190° C. and a load of 2.16 kg in accordance with JIS K 7210-1: 2014.

<Bulk Ratio of Expanded Bead>

A bulk ratio of the expanded beads is 55 times or more and 90 times or less. By setting the bulk ratio of the expanded beads within the specific range, the molded article magnification X of the foamed molded article obtained by in-mold molding the expanded beads can be easily set within a desired range. As a result, it is possible to easily obtain an expanded beads molded article having excellent rigidity and protective properties and a small mass per unit volume. From the viewpoint of further improving the protective properties for the object to be packaged and further reducing the mass per unit volume of the expanded beads molded article while securing excellent rigidity, the bulk ratio of the expanded beads is preferably 58 times or more, more preferably 60 times or more, still more preferably 62 times or more, and particularly preferably 65 times or more. From the viewpoint of further improving the rigidity of the expanded beads molded article, the bulk ratio of the expanded beads is preferably 85 times or less, and more preferably 80 times or less.

When the bulk ratio of the expanded beads is smaller than the specific range, the molded article magnification X of the expanded beads molded article to be obtained tends to be small. Therefore, the lightness in weight of the expanded beads molded article may be apt to be impaired. In addition, there is a possibility that the protective properties for the object to be packaged may be deteriorated. When the bulk ratio of the expanded beads is larger than the specific range, the rigidity of the resulting expanded beads molded article may be apt to be lowered.

The above-described bulk ratio of the expanded beads is a value as calculated by the following method. First, sufficiently dried expanded beads are filled up to a marked line so as to be naturally deposited in a measuring flask having a volume of 1 L. The mass of the expanded beads in the measuring flask is measured, and the bulk density [kg/$m^3$] of the expanded beads is determined through unit conversion. Next, the bulk ratio of the expanded beads can be determined by dividing the density [kg/$m^3$] of the polypropylene-based resin contained in the core layer by the bulk density [kg/$m^3$] of the expanded beads.

<Ratio Between Core Layer and Covering Layer>

A mass ratio between the core layer and the covering layer in the expanded beads is in a range of the core layer: the covering layer=95:5 to 88:12. By setting the mass ratio between the core layer and the covering layer within the above-described specific range, the protective properties of the expanded beads molded article can be improved. When the mass ratio of the covering layer is smaller than the specific range, the 5% compressive stress $\sigma_5$ of the expanded beads molded article tends to be high, and the protective properties of the object to be packaged may be deteriorated. When the mass ratio of the covering layer is larger than the specific range, it becomes difficult to increase the bulk ratio of the expanded beads, and the lightness in weight may be impaired, and the 5% compressive stress $\sigma_5$ of the expanded beads molded article may increase. From the viewpoint of more reliably providing the above-described operational effects, the mass ratio between the core layer and the covering layer is more preferably the core layer:the covering layer=93:7 to 89:11.

<Average Bead Diameter of Expanded Bead and Coefficient of Variation in Bead Diameter>

An average bead diameter of the expanded beads is preferably 2 mm or more and 8 mm or less, and a coefficient of variation in bead diameter is preferably 3% or more and 15% or less. A smaller coefficient of variation in bead diameter means a narrower bead size distribution of the expanded beads. As described above, by performing in-mold molding using expanded beads having a narrow bead size distribution and a small variation in bead diameter, variations in physical properties of the expanded beads molded article can be further reduced. As a result, desired rigidity and protective properties can be more reliably exhibited in the entire expanded beads molded article. From the same viewpoint, the average bead diameter of the expanded beads is 3 mm or more and 6 mm or less, and the coefficient of variation in bead diameter is more preferably 5% or more and 12% or less. Note that the coefficient of variation in bead diameter of the expanded beads can be adjusted to fall within the above range by using carbon dioxide as an inorganic physical blowing agent, for example, in a step of producing a first-step expanded beads which will be described later.

The average bead diameter of the expanded beads is a value of a median diameter (that is, cumulative 50% particle diameter d50) as calculated based on a volume-based bead size distribution of the expanded beads. The coefficient of variation in bead diameter is a value obtained by dividing the average bead diameter described above by a standard deviation calculated based on the volume-based bead size distribution.

In calculating the average bead diameter and the coefficient of variation in bead diameter, as the number of expanded beads used for measurement is increased, more accurate values of the average bead diameter and the coefficient of variation in bead diameter can be calculated. The number of the expanded beads used for measurement may be, for example, 100 or more. The volume-based bead size distribution of the expanded beads can be measured using a particle size distribution measuring apparatus (for example, "Millitrack JPA" manufactured by Nikkiso Co., Ltd.) or the like.

An average mass per one expanded bead is preferably 0.05 mg or more and 10 mg or less, more preferably 0.1 mg or more and 5 mg or less, and still more preferably 0.5 mg or more and 3 mg or less, from the viewpoint of further improving the filling property into the mold, the fusion bondability between the expanded beads, and the like in the in-mold molding. The average mass per one expanded bead can be controlled by appropriately adjusting the mass of the resin beads in a granulating step which will be described later.

<Average Cell Diameter of Entire Expanded Bead>

The average cell diameter D of the entire expanded beads is preferably 80 μm or more and 170 μm or less, more preferably 100 μm or more and 170 μm or less, still more preferably 120 μm or more and 160 μm or less, and particularly preferably 130 μm or more and 150 μm or less. By setting the average cell diameter D of the entire expanded beads within the above-described specific range, the rigidity of the expanded beads molded article can be enhanced. In addition, the 5% compressive stress $\sigma_5$ can be more easily reduced, and the protective properties of the expanded beads molded article can be further improved.

The average cell diameter D of the entire expanded beads is a value as calculated by the following method. First, the expanded beads are divided into approximately two equal parts. Using a scanning electron microscope, an enlarged photograph is acquired so that all cut sections exposed by the division are included within a field of view. On the obtained enlarged photograph, four line segments are drawn from an outermost surface of the expanded bead to the opposite outermost surface through a central part, so that angles formed by the adjacent line segments are equal. That is, the angles formed by the adjacent line segments are each 45°.

A total length of the four line segments thus obtained is divided by a total number of cells intersecting the line segments to calculate a cell diameter of the entire expanded beads in the individual expanded beads. The above operation is performed on 10 expanded beads extracted randomly, and a value obtained by arithmetically averaging the cell diameters of the entire expanded beads obtained for the respective expanded beads is defined as average cell diameter D of the expanded beads.

<Average Cell Diameter in Surface Layer Part of Expanded Bead>

A ratio Ds/D of the average cell diameter Ds [μm] in the surface layer part of the expanded beads to the average cell diameter D of the entire expanded beads is preferably 0.80 or more and 1.20 or less. By reducing a difference between the average cell diameter Ds in the surface layer part of the expanded beads and the average cell diameter D of the entire expanded beads in this way, growth of the cells accompanying secondary expansion during the in-mold molding becomes more uniform, and it is possible to more easily obtain the expanded beads molded article in which the ratio $d_s/d_i$ of the average cell diameter $d_s$ in the surface layer part of the expanded beads molded article to the average cell diameter $d_i$ in the inner part thereof is within the above-described preferable range. As a result, variations in physical properties of the expanded beads molded article can be further reduced, and, therefore, the protective properties of the expanded beads molded article can be further improved.

From the viewpoint of more reliably providing the above-described operational effects, the ratio Ds/D of the average cell diameter Ds [μm] in the surface layer part of the expanded beads to the average cell diameter D of the entire expanded beads is more preferably 0.87 or more and 1.10 or less, still more preferably 0.85 or more and 1.18 or less, and particularly preferably 0.88 or more and 1.05 or less.

The average cell diameter Ds in the surface layer part of the expanded beads is preferably 80 μm or more and 180 μm or less, more preferably 110 μm or more and 170 μm or less, and still more preferably 120 μm or more and 160 μm or less. By in-mold molding such expanded beads, the protective properties for object to be packaged of the expanded beads molded article can be further improved.

The average cell diameter Ds in the surface layer part of the expanded beads is a value as calculated by the following method. First, the expanded beads are divided into approximately two equal parts. Using a scanning electron microscope, an enlarged photograph is acquired so that all cut sections exposed by the division are included within a field of view. A peripheral length of the outermost surface of the expanded bead in the obtained enlarged photograph, that is, a length of an outer peripheral edge of the expanded bead at the cut section, is divided by the number of cells in contact with the outer peripheral edge of the expanded bead, thereby calculating the cell diameter in the surface layer part in the individual expanded beads. This operation is performed on 10 expanded beads extracted randomly, and a value obtained by arithmetically averaging the cell diameters in the surface layer part obtained for each expanded bead is defined as average cell diameter Ds in the surface layer part of the expanded bead.

<Closed Cell Content>

A closed cell content of the expanded beads is preferably 85% or more, more preferably 90% or more, and still more preferably 95% or more. In this case, the moldability of the expanded beads, the rigidity of the resulting expanded beads molded article, and the like can be further improved. The closed cell content of the expanded beads can be measured in accordance with ASTM-D 2856-70 by using an air comparison pycnometer.

<High Temperature Peak>

The expanded beads preferably have a crystal structure in which one or more endothermic peaks appear on a higher temperature side (hereinafter, referred to as "high temperature peak") than an apex of an endothermic peak intrinsic in the polypropylene-based resin contained in the core layer (hereinafter, referred to as "intrinsic peak") in the DSC curve obtained by heat flux DSC. In this case, the closed cell content of the expanded beads can be further increased, and molding conditions for molding the expanded beads molded article can be selected from a wide range. In addition, the rigidity of the resulting expanded beads molded article can be further enhanced. From such a viewpoint, an endothermic amount (hereinafter, referred to as "heat of high temperature peak") at the high temperature peak is preferably 5 to 50 J/g, and more preferably 8 to 40 J/g.

The heat of high temperature peak of the expanded beads can be calculated, for example, by the following method. First, heat flux DSC is performed using 1 to 3 mg of expanded beads to obtain a DSC curve. At this time, a start temperature of the measurement is 10 to 40° C., an end temperature of the measurement is 220° C., and a temperature raising rate is 10° C./min. When the expanded beads have a high temperature peak, as shown in FIG. 1, an intrinsic peak ΔH1 and a high temperature peak ΔH2 having an apex on a higher temperature side than an apex of the intrinsic peak ΔH1 appear in the DSC curve.

Next, a straight line L1 connecting a point α corresponding to 80° C. and a point β corresponding to the end temperature of melting T of the expanded beads on the DSC curve is drawn. The end temperature of melting T is an end point of the higher temperature side of the high temperature peak ΔH2, that is, an intersection of the high temperature peak ΔH2 and a baseline of the higher temperature side than the high temperature peak ΔH2 in the DSC curve.

After the straight line L1 is drawn, a straight line L2 that passes through a maximum point γ existing between the intrinsic peak ΔH1 and the high temperature peak ΔH2 and is parallel to the vertical axis of the graph is drawn. The intrinsic peak ΔH1 and the high temperature peak ΔH2 are divided by the straight line L2. The endothermic amount of the high temperature peak ΔH2 can be calculated based on an area of a portion surrounded by a part constituting the high temperature peak ΔH2 in the DSC curve, the straight line L1, and the straight line L2.

When the DSC curve is obtained by the above-described method, then the expanded beads are once cooled, and the DSC curve is obtained again, only the intrinsic peak ΔH1 appears in the DSC curve, and the high temperature peak ΔH2 disappears from the DSC curve.

(Method for Producing Expanded Bead)

The expanded beads can be prepared, for example, by a two-step expanding method including the following steps. Specifically, a method for producing the expanded bead preferably includes:

a granulating step of forming a polypropylene-based resin bead including: a core layer, in a non-foamed state, containing a polypropylene-based resin having a flexural modulus Mc of 800 MPa or more and 1200 MPa or more; and a covering layer, which covers the core layer, containing a polyethylene-based resin having a flexural modulus Ms of 250 MPa or less, wherein a mass ratio between the core layer to the covering layer is the core layer: the covering layer=95:5 to 88:12;

a first expanding step of impregnating the polypropylene-based resin bead dispersed in a dispersion medium in a sealed container with an inorganic physical blowing agent, and then releasing the polypropylene-based resin bead and the dispersion medium from the sealed container to a pressure lower than that in the sealed container, thereby obtaining a first-step expanded bead including: a core layer, in a foamed state, containing the polypropylene-based resin; and a covering layer, which covers the core layer, containing the polyethylene-based resin; and a second expanding step of impregnating the first-step expanded bead with an inorganic gas in a pressure-resistant container to increase a pressure in cells of the first-step expanded bead, and then heating the first-step expanded bead taken out from the pressure-resistant container under a pressure lower than that in the cells to further expand the first-step expanded bead, thereby obtaining a polypropylene-based resin expanded bead having a bulk ratio (II) of 55 times or more and 90 times or less.

The expanded beads produced by the two-step expanding method including the above-described steps can be used to form a molded article of polypropylene-based resin expanded beads which is excellent in protective properties for an object to be packaged and rigidity and has a small mass per unit volume. In addition, the decrease in closed cell content of the expanded beads can be more reliably suppressed. Hereinafter, each step will be described in more detail.

<Granulating Step>

The method for preparing the polypropylene-based resin bead (hereinafter, abbreviated as "resin bead") in the bead forming step is not particularly limited. For example, the resin beads can be obtained by preparing a strand in which the periphery of the core layer is covered with the covering layer by extrusion molding, and then cutting the strand into desired dimensions by a pelletizer or the like. The resin bead obtained by such a method have a multilayer structure in which a strip-shaped covering layer is formed around the core layer.

An average mass per one resin bead is preferably 0.05 mg to 10 mg, more preferably 0.1 mg to 5 mg, and still more preferably 0.5 mg to 3 mg, from the viewpoint of further improving the filling property of the expanded beads into the mold, the fusion bondability, and the like.

<First Expanding Step>

In a first expanding step, first, the resin beads are placed in a sealed container and dispersed in an aqueous dispersion medium such as water. At this time, a dispersant for dispersing the resin beads in the dispersion medium in the sealed container may be added as necessary.

As the dispersant, for example, inorganic fine particles such as aluminum oxide, aluminum sulfate, tricalcium phosphate, magnesium pyrophosphate, zinc oxide, kaolin, and mica, and surfactants such as sodium alkylbenzenesulfonate, sodium dodecylbenzenesulfonate, and sodium alkanesulfonate can be used. As the dispersant, one type selected from these inorganic fine particles and surfactants may be used alone, or two or more types may be used in combination.

After the sealed container is hermetically sealed, an inorganic physical blowing agent is added into the container to impregnate the resin beads with the inorganic physical blowing agent. At this time, the impregnation of the resin beads with the inorganic physical blowing agent can be promoted by warming the inside of the sealed container simultaneously with pressurizing it. Then, after the resin beads are sufficiently impregnated with the blowing agent, the contents of the sealed container are released to a pressure lower than an internal pressure of the container, whereby the resin beads can be expanded to form first-step expanded beads.

By expanding the resin beads using the inorganic physical blowing agent in the first expanding step, finally, expanded beads having a high expanding magnification and a narrow grain size distribution can be easily obtained. As the inorganic physical blowing agent, for example, inorganic gases such as carbon dioxide, nitrogen and air, water, and the like can be used. These substances may be used alone, or two or more substances may be used in combination as the inorganic physical blowing agent. As the inorganic physical blowing agent in the first expanding step, carbon dioxide is preferably used, from the viewpoint of more easily obtaining expanded beads having a high expanding magnification and a narrow bead size distribution.

An amount of the inorganic physical blowing agent to be added can be appropriately set according to the type of the polypropylene-based resin contained in the core layer, the type of the blowing agent, the bulk ratio of the target expanded beads, and the like, but is 0.1 parts by mass to 30 parts by mass, preferably 0.5 parts by mass to 15 parts by mass, and more preferably 1 part by mass to 10 parts by mass with respect to 100 parts by mass of the polypropylene-based resin contained in the core layer.

The first expanding step may include a step of generating the above-described high temperature peak before expanding the resin beads. As a method for generating a high temperature peak, for example, a method in which resin beads are retained within a specific temperature range in a dispersion medium in a sealed container and heat treatment is performed can be adopted. A timing of performing the heat treatment is not particularly limited, and the heat treatment may be performed at any of time points, i.e., before impregnation, during impregnation, and after impregnation of the blowing agent, or may be performed over two or more of the time points described above. By this heat treatment, expanded beads having a crystal structure showing a melting peak (intrinsic peak) derived from a crystal intrinsic in the polypropylene-based resin and a melting peak (high temperature peak) located on a higher temperature side than the intrinsic peak can be obtained.

A bulk ratio (I) of the first-step expanded beads is a value lower than the bulk ratio of the expanded beads to be finally obtained, and is preferably 25 times or more and 38 times or less. By setting the bulk ratio in the first expanding step within the above-mentioned specific range, the cell diameter of the entire beads can be reduced, it is possible to and to further reduce a difference between the cell diameter of the entire beads and the cell diameter in the surface layer part of the beads, in the first-step expanded beads. The bulk ratio (I) [times] of the first-step expanded beads is a value obtained by dividing the density [$kg/m^3$] of the polypropylene-based resin contained in the core layer by the bulk density [$kg/m^3$] of the first-step expanded beads.

<Second Expanding Step>

In a second expanding step, first, a pressure-resistant container is filled with the first-step expanded beads. Next, the inside of the pressure-resistant container is pressurized with an inorganic gas to impregnate the first-step expanded beads with the inorganic gas. By impregnating the first-step expanded beads with the inorganic gas in this manner, the pressure in the cells of the first-step expanded beads can be made higher than that before impregnation.

In the second expanding step, the first-step expanded beads in the pressure-resistant container may be warmed while pressurizing the inside of the pressure-resistant container. In this case, the impregnation of the first-step expanded beads with the inorganic gas can be further promoted. When the first-step expanded beads are warmed in the second expanding step, a heating temperature of the first-step expanded beads is preferably lower than the melting point of the covering layer, from the viewpoint of suppressing blocking, that is, a phenomenon in which the first-step expanded beads are fused with each other to form a lump.

As the inorganic gas used in the second expanding step, carbon dioxide, nitrogen, air, steam, and the like can be used. These inorganic gases may be used singly, or two or more thereof may be used in combination. The inorganic gas used in the second expanding step is preferably a mixed gas of steam and air. In this case, the first-step expanded beads are appropriately warmed to further promote the impregnation thereof with the inorganic gas, and blocking of the first-step expanded beads can be more effectively suppressed.

The pressure (internal pressure) in the cells can be measured by, for example, the method described in JP 2003-201361 A.

After completion of the impregnation of the first-step expanded beads with the inorganic gas, the first-step expanded beads are taken out from the pressure-resistant container. The first-step expanded beads can be heated using steam or the like at a pressure lower than the pressure in an inside of the cells to expand the individual cells. As a result, the bulk ratio of the first-step expanded beads is increased, and expanded beads having a desired bulk ratio can be obtained.

From the viewpoint of more effectively suppressing blocking of the first-step expanded beads, it is preferable that the pressure within the cells of the first-step expanded beads be set to 0.40 MPa (G) or more and 0.60 MPa (G) at a gauge pressure by impregnating the first-step expanded beads with the mixed gas of air and steam as the inorganic gas in the second expanding step, and then that the first-step expanded beads taken out from the pressure-resistant container be heated with steam having a pressure of 0.05 MPa (G) or more and 0.25 MPa (G) or less at the gauge pressure.

A ratio (II)/(I) of the bulk ratio (II) of the first-step expanded beads to the bulk ratio (I) of the expanded beads, that is, a rate of increase in bulk ratio in the second expanding step is preferably 1.8 or more and 3.0 or less, and more preferably 2.0 or more and 2.8 or less. By setting the rate of increase in bulk ratio in the second expanding step within the above-described specific range, excessive expansion of cells of the expanded beads can be suppressed. As a result, the average cell diameter of the entire expanded beads can be further reduced, and a difference between the cell diameter in the inside of the expanded beads and the cell diameter in the surface layer part thereof can be further reduced. By in-mold molding such expanded beads, an expanded beads molded article having desired physical properties can be more easily obtained.

From the viewpoint of more reliably providing the above-described operational effects, it is preferable that, in the first expanding step, the first-step expanded beads having a bulk ratio (I) of 25 times or more and 38 times or less be prepared, and that, in the second expanding step, the first-step expanded beads are expanded so that a value of a ratio (II)/(1) of the bulk ratio (II) to the bulk ratio (I) of the polypropylene-based resin expanded beads be 1.8 or more and 3.0 or less, thereby obtaining expanded beads having a bulk ratio (TI) of 55 times or more and 90 times or less.

In the present specification, the container used in the first expanding step is referred to as "sealed container", and the container used in the second expanding step is referred to as "pressure-resistant container". However, any containers may be used as long as they can be sealed and can apply pressure, and the same containers may be used.

EXAMPLES

Examples of the expanded beads molded article and the expanded beads will be described. Note that aspects of the expanded beads molded article, the expanded beads, and the method for producing the same according to the present invention are not limited to the following Examples, and their configurations can be appropriately changed without impairing the gist of the present invention.

(Resin)

The resins used in this example are as shown in Table 1. In Table 1, the symbol "r-PP" in the "material" column represents a polypropylene random copolymer, "PP" represents polypropylene, and "LLDPE" represents linear low density polyethylene.

The physical properties of the resins shown in Table 1 are measured as follows.

<Flexural Modulus>

First, each resin was heat-pressed at 230° C. to prepare a sheet having a thickness of 4 mm. A test piece having dimensions of a length of 80 mm×a width of 10 mm× a thickness of 4 mm was cut out from the sheet. Using this test piece, a flexural modulus of the resin was measured in accordance with JIS K 7171: 2008. A radius R1 of an indenter and a radius R2 of a support base were both 5 mm, an inter-fulcrum distance was 64 mm, and a test speed was 2 mm/min.

<Melting Point>

A melting point of the resin was measured in accordance with heat flux differential scanning calorimetry described in JIS K 7121: 1987. First, the test piece was allowed to stand in an environment of a temperature of 23° C. and a relative humidity of 50% RH for one day or more for condition adjustment. The test piece after the condition adjustment was heated from 23° C. to 200° C. at a temperature raising rate of 10° C./min, then cooled to 23° C. at a cooling rate of 10° C./min, and again heated from 23° C. to 200° C. at a temperature raising rate of 10° C./min. Then, a top temperature of an endothermic peak as determined by a DSC curve obtained at second temperature rise was defined as melting point of the resin. When a plurality of endothermic peaks appeared in the DSC curve obtained at the second temperature rise, the top temperature of the endothermic peak having the largest area was defined as the melting point. A heat flux differential scanning calorimeter ("DSC Q1000" manufactured by TA Instruments) was used to obtain the DSC curve.

<Melt Flow Rate>

The MFR of the resin was measured in accordance with JIS K 7210-1: 2014. The MFR of the polypropylene-based resin is a value measured under conditions of a temperature of 230° C. and a load of 2.16 kg, and the MFR of the polyethylene-based resin is a value measured under conditions of a temperature of 190° C. and a load of 2.16 kg.

<Degree of Polydispersion Mw/Mn>

A degree of polydispersion Mw/Mn of the polypropylene-based resin contained in the core layer was measured by the following method. First, a chromatogram of the resin was obtained by gel permeation chromatography (GPC) using polystyrene as a standard substance.

A chromatogram was obtained using 150C manufactured by WATERS CORPORATION. After preparation of a sample solution having a concentration of 2.2 mg/ml by dissolving a resin as a measurement sample in 1,2,4-trichlorobenzene, TSKgel (registered trademark) GMHHR-H(S) HT was used as a column, and the measurement sample was separated by a difference in molecular weight using gel permeation chromatography (GPC) under the following separation conditions: eluent: 1,2,4-trichlorobenzene, flow rate: 1.0 ml/min, and temperature: 145° C., to obtain a chromatogram.

Then, a retention time in the chromatogram obtained by a calibration curve created using standard polystyrene was converted into molecular weight to obtain a differential molecular weight distribution curve. A number average molecular weight Mn and a weight average molecular weight Mw of the resin were calculated from this differential molecular weight distribution curve, and then the degree of polydispersion Mw/Mn was calculated. The degree of polydispersion Mw/Mn of the polypropylene-based resin was as shown in Table 1. In this example, the degree of polydispersion Mw/Mn of the resin used as the covering layer was not measured. Therefore, in the column of the degree of polydispersion Mw/Mn of PP3, PE1, and PE2, the symbol "–" representing that measurement was not performed is shown.

(Preparation of Expanded Bead)

<Bead Forming Step>

In the preparation of the expanded beads A to G shown in Table 2, strands were prepared using a co-extruder in which a core layer forming extruder having an inner diameter of 65 mm and a covering layer forming extruder having an inner diameter of 30 mm were provided together, and a die capable of co-extruding a large number of multilayer strands was provided to an outlet side. The resins shown in the "core layer" column in Table 2 were supplied to the core layer forming extruder. Also, the resins shown in the "covering layer" column in Table 2 were supplied to the covering layer forming extruder.

Thereafter, a melt-kneaded product was co-extruded from each extruder so that a mass ratio between the core layer and the covering layer was a value as shown in Table 2. The melt-kneaded products extruded from the extruders join in the die, and are extruded from pores of cap attached to tips of the extruders into a multilayer strand shape in which an outer periphery of the core layer is covered with the covering layer. This co-extrudate was cooled with water to obtain a multilayer strand.

The obtained strand was cut using a pelletizer so as to have a mass as shown in Table 2. As a result, a resin beads including a core layer in a non-foamed state and a covering layer covering a side peripheral surface of the core layer was obtained.

In preparation of the expanded beads H shown in Table 2, resin beads were obtained in the same manner as described above except that a single extruder was used, in place of the co-extruder, to prepare the strand.

<First Expanding Step>

In a sealed container having an internal volume of 3 $m^3$, 400 kg of resin beads, 2000 L of water as a dispersion medium, 7000 g of kaolin, a surfactant, and 150 g of aluminum sulfate as a dispersant were enclosed. Specifically, sodium alkylbenzene sulfonate ("NEOGEN S-20F" manufactured by DKS Co., Ltd.) was used as the surfactant. In addition, the surfactant was added so that an amount of an active ingredient was 800 g.

Next, carbon dioxide as a blowing agent was supplied into the sealed container so that the pressure in the container was a value (gauge pressure) shown in the "pressure in sealed container" column in Table 2, and the inside of the container was pressurized. In this state, the inside of the container was heated while being stirred, so that a temperature in the inside of the container was raised to an expanding temperature as shown in Table 2. This expanding temperature was retained for 10 minutes, and then the sealed container was opened in a state where the pressure in the sealed container was maintained at the value (gauge pressure) shown in the "Pressure in sealed container" column in Table 2 by pressurization with carbon dioxide, and the contents were released to atmospheric pressure to expand the resin beads. As described above, first-step expanded beads having a multilayer structure, including a core layer in a foamed state, and a covering layer covering the core layer were obtained. Since the first-step expanded beads immediately after being released from the sealed container contained moisture, they were aged at a temperature of 23° C. for 24 hours.

<Second Expanding Step>

The pressure-resistant container was filled with the first-step expanded beads, and then air as the inorganic gas was injected into the pressure-resistant container to impregnate the inorganic gas into the cells. Next, steam and air were supplied to the first-step expanded beads taken out from the pressure-resistant container, and heated under atmospheric pressure. The pressure (gauge pressure) in the cells in the first-step expanded beads taken out from the pressure-resistant container was a value as shown in Table 2. The pressure (gauge pressure) of the air supplied at the time of heating was 0.20 MPa (G), and the pressure (gauge pressure) of the steam was as shown in Table 2. As described above, the bulk ratio of the first-step expanded beads was increased to obtain expanded beads (second-step expanded beads).

(First-Step Expanded Bead and Expanded Bead)

The physical properties of the first-step expanded beads and the expanded beads shown in Table 2 are measured as follows.

<Bulk Density ρ(A) of First-Step Expanded Bead Immediately after Expanding>

In the first expanding step, the first-step expanded beads immediately after being released from the sealed container were collected, and the moisture adhering to the surface was wiped off. The first-step expanded beads were filled up to a marked line so as to be naturally deposited in a measuring flask having a volume of 1 L. Then, the mass [g/L] of the first-step expanded beads in the measuring flask was measured, and the bulk density ρ(A) [$kg/m^3$] of the first-step expanded beads immediately after expanding was determined through unit conversion.

<Bulk Density ρ(B) of First-Step Expanded Beads after Aging>

The first-step expanded beads were filled in the measuring flask in the same manner as described above, except that the first-step expanded beads after being released from the sealed container and then aged in the first expanding step were used. Then, the mass [g/L] of the first-step expanded beads in the measuring flask was measured, and the bulk density ρ(B) [$kg/m^3$] of the first-step expanded beads after aging was determined through unit conversion.

<Bulk Ratio (I) of First-Step Expanded Bead>

A value obtained by dividing the density of the polypropylene-based resin contained in the core layer by the bulk density ρ(B) of the first-step expanded beads after aging was defined as bulk ratio (I) of the first-step expanded beads.

<Bulk Density ρ(C) of Expanded Bead>

The expanded beads were filled in the measuring flask in the same manner as the method for measuring the bulk density of the first-step expanded beads after aging described above, except that the expanded beads were used instead of the first-step expanded beads. Then, the mass [g/L] of the expanded beads in the measuring flask was measured, and a bulk density ρ(C) [$kg/m^3$] of the expanded beads was determined through unit conversion.

<Bulk Ratio (II) of Expanded Bead>

A value obtained by dividing the density of the polypropylene-based resin contained in the core layer by the bulk density ρ(C) of the expanded beads was defined as bulk ratio (II) of the expanded beads.

<Average Bead Diameter and Coefficient of Variation in Bead Diameter>

Using about 200 expanded beads, the volume-based bead size distribution of the expanded beads was measured using a particle size distribution measuring apparatus ("Millitrack JPA" manufactured by Nikki so Co., Ltd.). A median diameter in the obtained bead size distribution, that is, cumulative 50% particle diameter, was defined as average bead diameter of the expanded beads. In addition, a value obtained by dividing the average bead diameter of the expanded beads by standard deviation of the bead diameter calculated based on the bead size distribution described above was defined as coefficient of variation in bead diameter.

<Closed Cell Content>

A value of a closed cell content is a value determined by the following method. First, a value Vx of a true volume of an expanded bead (sum of a volume of the resin constituting the expanded bead and a total cell volume of closed cell portions in the expanded bead) was measured according to Procedure C described in ASTM-D2856-70. For the measurement of the true volume Vx, an air comparison pycnometer "930" manufactured by Beckman Toshiba Ltd. was used. Next, the closed cell content (unit: %) was calculated according to the following formula (1), and an arithmetic average value of measurement results of five expanded beads was determined.

$$\text{Closed cell content}=(Vx-W/\rho)\times 100/(Va-W/\rho) \quad (1)$$

Note that the meanings of the symbols used in the above formula (1) are as follows.

Vx: true volume of expanded bead measured by the above-described method (unit: $cm^3$)

Va: apparent volume of expanded bead calculated based on outer dimensions (unit: $cm^3$)

W: mass of expanded bead used for measurement (unit: g)

ρ: density of resin constituting expanded bead (unit: $g/cm^3$)

<Heat of High Temperature Peak>

A heat of high temperature peak of the expanded beads was measured by the method described above. That is, heat flux DSC was performed using about 3 mg of expanded beads, and a peak area of a high temperature peak in the obtained DSC curve was defined as heat of high temperature peak of the expanded beads. A start temperature of the measurement in the heat flux DSC was 23° C., an end temperature of the measurement was 200° C., and the temperature raising rate was 10° C./min. A heat flux differential scanning calorimeter ("DSC Q1000" manufactured by TA Instruments) was used to obtain the DSC curve.

<Average Cell Diameter D of Entire Expanded Bead>

Figure 2:
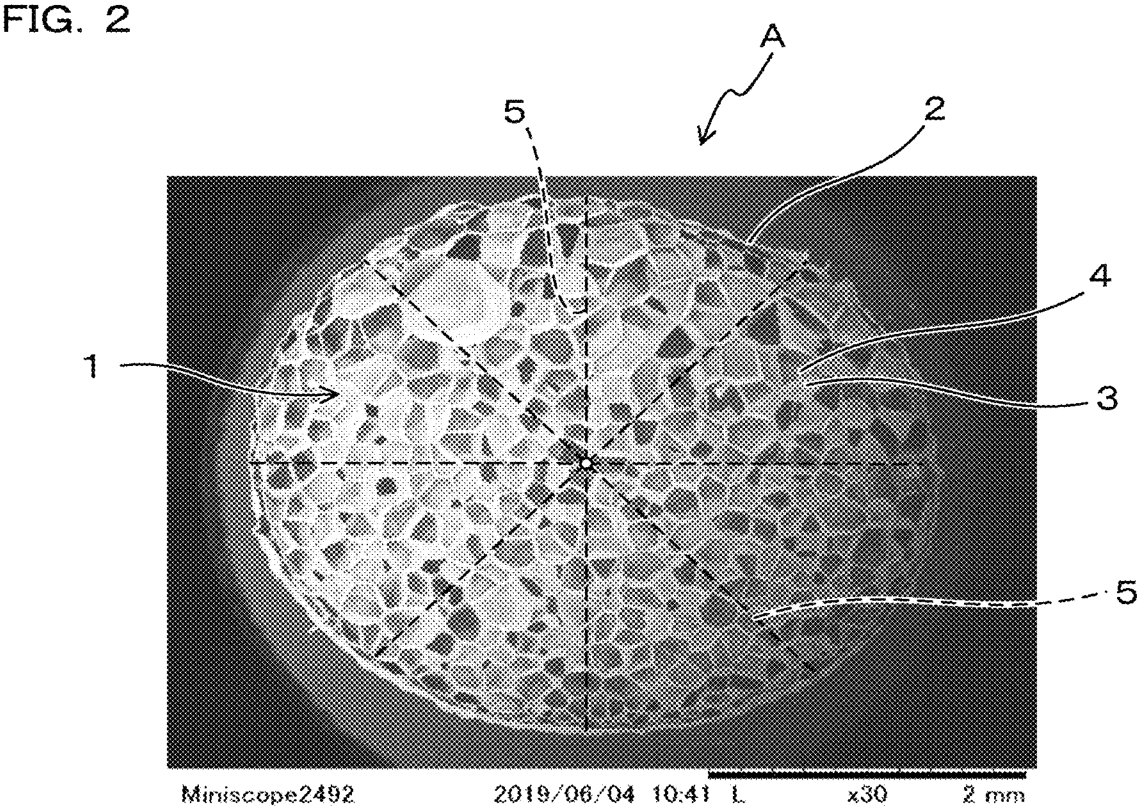
FIG. 2 is an enlarged photograph of a cut section of an expanded bead A.
Figure 3:
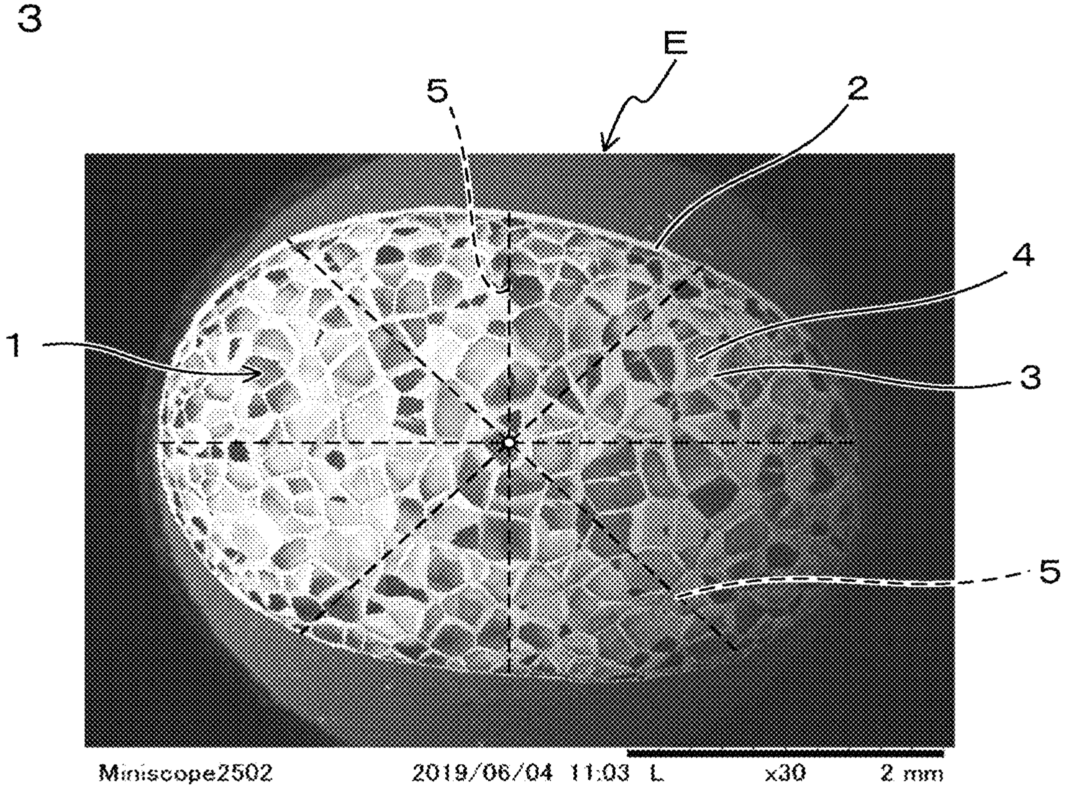
FIG. 3 is an enlarged photograph of a cut section of an expanded bead E.
Figure 4:
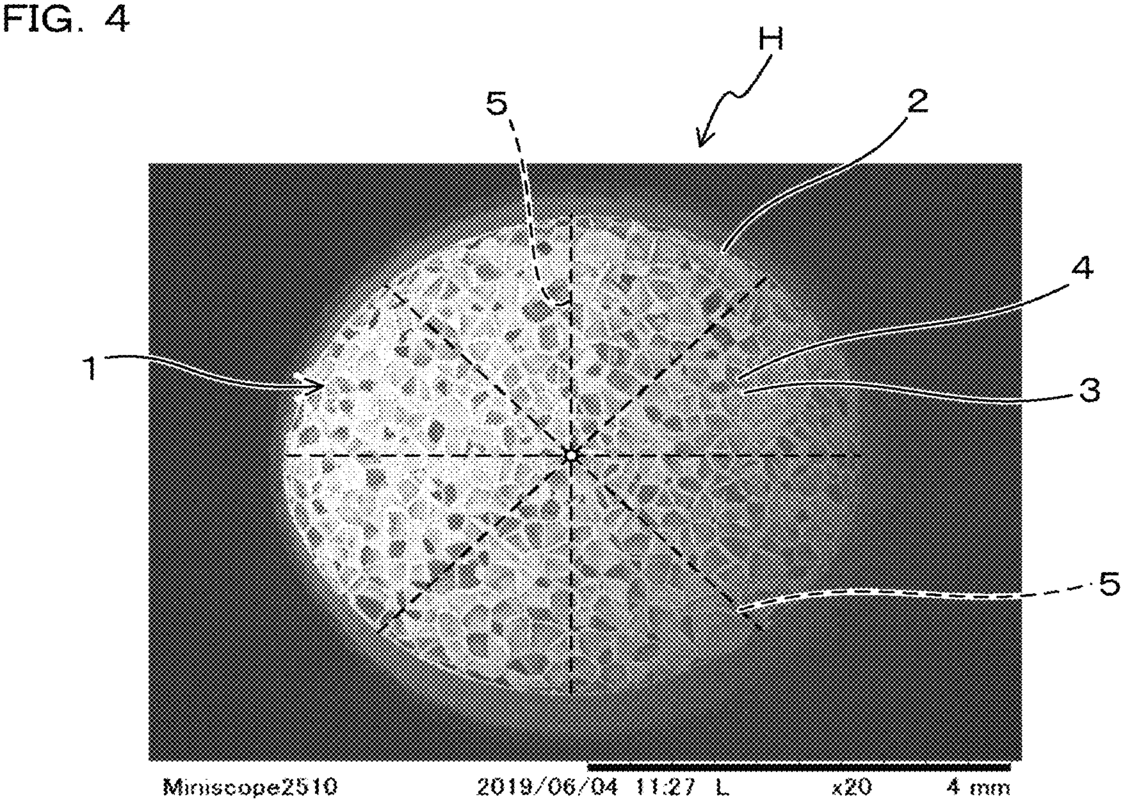
FIG. 4 is an enlarged photograph of a cut section of an expanded bead H.

The expanded beads were divided into approximately two equal parts, and then an enlarged photograph was obtained using a scanning electron microscope so that all the cut sections exposed by the division were within the field of view. As example enlarged photographs, an enlarged photograph of a cut section of an expanded bead A is shown in FIG. 2, that of an expanded bead E is shown in FIG. 3, and that of an expanded bead H is shown in FIG. 4. An outermost surface 2 of the expanded beads appearing on a cut section 1 of the expanded bead, that is, a contour of the cut section 1 has a substantially circular shape. In addition, a large number of cells 4 partitioned by a resin film 3 appear on the cut section 1 of the expanded bead.

On these enlarged photographs, four line segments 5 are drawn from the outermost surface 2 of the expanded bead to the opposite outermost surface 2 through the central part, so that angles formed by the adjacent line segments 5 are equal. That is, the four line segments 5 were drawn such that the angles formed by the adjacent line segments 5 were 45°. A total length of the four line segments 5 thus obtained was divided by a total number of cells 4 intersecting the line segments 5 to calculate a cell diameter of the entire expanded beads in the individual expanded beads. The above operation was performed on 10 expanded beads extracted randomly, and a value obtained by arithmetically averaging the cell diameters of the entire expanded beads obtained for the respective expanded beads was defined as average cell diameter D of the expanded beads.

<Average Cell Diameter Ds in Surface Layer Part of Expanded Bead>

First, the expanded beads were divided into approximately two equal parts, and then an enlarged photograph of a cut section exposed by division was obtained using a scanning electron microscope. A peripheral length of the outermost surface 2 of the expanded bead appearing on the cut section 1 in the obtained enlarged photograph, that is, the length of the contour of the cut section 1, was divided by the number of cells in contact with the outermost surface 2 to calculate the cell diameter in the surface layer part in the individual expanded beads. This operation was performed on 10 expanded beads extracted randomly, and a value obtained by arithmetically averaging the cell diameters in the surface layer part obtained for each expanded bead was defined as average cell diameter Ds in the surface layer part of the expanded bead.

(Preparation of Expanded Beads Molded Article)

In this example, a flat plate-shaped expanded beads molded article having dimensions of a length of 300 mm× a width of 250 mm× a thickness of 60 mm was prepared by the following method. First, a mold capable of forming the flat plate-shaped expanded beads molded article was prepared, and expanded beads were filled in a cavity of the mold by a cracking filling method. The cracking filling method is a method of mechanically compressing expanded beads by extending a molding space as large as a predetermined cracking gap before filling expanded beads into the mold, and then closing the mold after filling to narrow the molding space.

In this example, expanded beads were filled in a state where the molding space was widened by 6 mm in the thickness direction of the expanded beads molded article so that the volume of the cracking gap was 10% of the volume of the expanded beads molded article to be obtained. Then, after the mold was closed, the molding space was narrowed in the thickness direction of the expanded beads molded article to attain desired dimensions. In this state, steam having a gauge pressure as shown in the "molding pressure" columns of Tables 3 and 4 was supplied into the mold, and main heating was performed for a time indicated in the "main heating time" columns of Tables 3 and 4 to perform in-mold molding. The pressure (gauge pressure) received by the mold during in-mold molding was a value as shown in the "surface pressure" column of Tables 3 and 4. As described above, flat plate-shaped expanded bead molded articles (Examples 1 to 3, Comparative Examples 1 to 4, and Reference Example 1) was obtained. The resulting expanded bead molded articles were each allowed to stand at 30° C. for 12 hours, and the following physical properties were measured using the expanded beads molded article after being allowed to stand.

(Physical Properties of Expanded Beads Molded Article)

The physical properties of the expanded bead molded articles shown in Tables 3 and 4 are measured as follows.

<Molded Article Density ρ(D)>

A measurement sample having no surface layer part of 50 mm in length×50 mm in width×10 mm in thickness was collected from the vicinity of the center part of the expanded beads molded article. A value obtained by dividing the mass of the measurement sample by the volume of the measurement sample as calculated based on the dimensions is defined as molded article density ρ(D) [kg/m$^3$] of the expanded beads molded article.

<Molded Article Magnification X>

A value obtained by dividing the density of the polypropylene-based resin contained in the core layer by the molded article density ρ(D) of the expanded beads molded article was defined as X [times].

<Apparent Density ρ(E) in Surface Layer Part>

The expanded beads molded article was cut at a surface having a depth of 3 mm in the thickness direction from the skin surface, and a surface layer part of the expanded beads molded article was cut out. The surface layer part was cut into a square of 50 mm in length×50 mm in width, and a small piece having dimensions of 50 mm in length, 50 mm in width, and 3 mm in thickness, in which one surface in the thickness direction, was a skin surface was collected. The small piece was allowed to stand in an environment of a temperature of 23° C. and a relative humidity of 50% RH for one day, and then the mass of the small piece was measured. Then, a value obtained by dividing the mass of the small piece by the volume calculated based on the dimensions of the small piece was defined as apparent density ρ(E) [kg/m$^3$] in the surface layer part.

<Average Cell Diameter $d_i$ in Inner Part of Expanded Beads Molded Article>

First, a small piece having a cubic shape with each side of 10 mm and having no skin surface was collected from the vicinity of the center part of the expanded beads molded article. The small piece was observed using a scanning electron microscope, and an enlarged photograph of a surface parallel to the thickness direction of the expanded beads molded article was obtained. A line segment passing through the center in the thickness direction was drawn on the obtained enlarged photograph, and a number of cells intersecting the line segment was counted. Then, a value obtained by dividing a length of the line segment by the number of cells intersecting the line segment was defined as average cell diameter $d_i$ [μm] in the inner part of the expanded beads molded article.

<Average Cell Diameter $d_i$ in Surface Layer Part of Expanded Beads Molded Article>

First, a straight line L3 parallel to the longitudinal direction and bisecting the lateral direction of the expanded beads molded article was drawn on a surface of 300 mm in length×250 mm in width of the expanded beads molded article. Next, three straight lines L4 parallel to the lateral direction were drawn so as to equally divide the straight line L3 into four parts. Then, three small pieces each having a cubic shape with each side of 3 mm, in which either one surface was a skin surface, were collected such that three intersections between the straight line L3 and the straight lines L4 were located at the center of the surface.

Each small piece was observed using a scanning electron microscope, and an enlarged photograph of a surface parallel to the thickness direction of the expanded beads molded article was obtained. On the obtained enlarged photograph, a line segment parallel to the skin surface was drawn such that the depth (that is, a distance in the thickness direction) from the skin surfaces was 50 μm, and the number of cells intersecting the line segment was counted. Then, a value obtained by dividing the length of the line segment described above by the number of cells intersecting the line segment was defined as cell diameter in the surface layer part of each small piece, and an arithmetic average value of the cell diameters in the surface layer parts of the three small pieces was defined as average cell diameter $d_s$ in the surface layer part of the expanded beads molded article.

<Internal Fusion-Bonding Rate>

The surface layer parts present on both sides in the thickness direction were removed from the expanded beads molded article, and then the expanded beads molded article was broken so as to be substantially equally divided in the longitudinal direction. One hundred (100) or more expanded beads selected randomly from among the expanded beads exposed on a fracture surface were visually observed, and it was determined whether the expanded beads were expanded beads having fractured inside the beads (that is, the expanded beads subjected to material destruction) or expanded beads having fractured at interfaces between the expanded beads. Then, a value obtained by expressing the ratio of the number of expanded beads having fractured inside the beads to the total number of the observed expanded beads in percentage is shown as an internal fusion-bonding rate of the expanded beads molded article in Tables 3 and 4.

In the evaluation of the internal fusion-bonding rate, a case where the internal fusion rate was 90% or more was evaluated as acceptable because of excellent fusion bondability, and a case where the internal fusion-bonding rate was less than 90% was evaluated as unacceptable because of insufficient fusion bondability.

<Secondary Expandability>

A 100 mm×100 mm square was drawn at the central part of one skin surface in the thickness direction of the expanded beads molded article, and then a diagonal line was drawn from any one corner of the square. Then, a number of voids existing on the diagonal line, that is, voids having a size of 1 mm×1 mm or more, among gaps formed between the expanded beads, was counted. In the "Secondary expandability" columns of Tables 3 and 4, the symbol "A" is shown when the number of voids was 2 or less, and the symbol "B" is shown when the number of voids was 3 or more. In the evaluation of the secondary expandability, the case of the symbol "A" representing that the number of voids was 2 or less was evaluated as acceptable because the expanded beads were sufficiently secondarily expanded during in-mold molding, and the case of the symbol "B" representing that the number of voids was 3 or more was evaluated as unacceptable because the secondary expandability was insufficient.

<Recoverability>

The thickness of the expanded beads molded article was measured at positions 10 mm away from the four corners toward the center of the skin surface in plan view of the expanded beads molded article viewed from the thickness direction. Among these thicknesses, the largest value was defined as thickness of a corner part of the expanded beads molded article. Apart from this, the thickness of the expanded beads molded article was measured at a central position in both the longitudinal direction and the lateral direction in plan view of the expanded beads molded article viewed from the thickness direction, and this value was defined as thickness of the central part of the expanded beads molded article. Then, a ratio (%) of the thickness of the central part to the thickness of the corner part of the expanded beads molded article was calculated.

In the "recoverability" columns of Tables 3 and 4, the symbol "A" is shown when the ratio of the thickness of the central part to the thickness of the corner part was 95% or more, and the symbol "B" is shown when the ratio was less than 95%. In the evaluation of recoverability, the case of the symbol "A" representing that the ratio of the thickness of the central part to the thickness of the corner part was 95% or more was evaluated as acceptable because a shrinkage amount of the central part after molding was small and the recoverability was excellent, and the case of the symbol "B" representing that the ratio was less than 95% was evaluated as unacceptable because the shrinkage amount of the central part after molding was large and the recoverability was poor.

<Surface Hardness>

A rectangular parallelepiped test piece having a thickness of 60 mm collected from the expanded beads molded article was allowed to stand for one day or more in an environment of a temperature of 23° C. and a relative humidity of 50% RH. A type C durometer (Asker rubber hardness tester type C) in accordance with JIS K 7312: 1996 was brought into contact with the skin surface of the test piece, and a scale value after 3 seconds from a time point of contact was recorded. This operation was performed on five points randomly selected on the skin surface, and an arithmetic mean of the obtained scale values was defined as surface hardness of the expanded beads molded article.

<Evaluation of Lightness in Weight>

In the evaluation of the lightness in weight, a case where the molded article magnification X was 55 times or more was evaluated as acceptable because of a small mass per unit volume and excellent lightness in weight, and the symbol "Good" is shown in the "Evaluation" column. A case where the molded article magnification X was less than 55 times was evaluated as unacceptable because of a large mass per unit volume and poor lightness in weight, and the symbol "Poor" was shown in the "Evaluation" column.

<5% Compressive Stress $\sigma_5$ and 50% Compressive Stress $\sigma_{50}$>

The 5% compressive stress $\sigma_5$ and the 50% compressive stress $\sigma_{50}$ were measured in accordance with the provision of JIS K 6767: 1999. First, a test piece of 50 mm in length, 50 mm in width, and 25 mm in thickness having no skin surface was collected from the vicinity of the center part of the expanded beads molded article. This test piece was allowed to stand under an environment of a temperature of 23° C. and a relative humidity of 50% RH for 24 hours to adjust the condition, and a compression test was performed at a compression rate of 10 mm/min using the test piece after the condition adjustment. In the compression test, a universal testing machine ("TENSILON RTF-1350" manufactured by A & D Company, Limited) was used. In the obtained compressive stress-strain curve, the compressive stress at a strain of 5% was defined as 5% compressive stress $\sigma_5$, and the compressive stress at a strain of 50% was defined as 50% compressive stress $\sigma_{50}$.

<Evaluation of Protective Properties>

In the evaluation of the protective properties, a case where a value of the 5% compressive stress $\sigma_5$ was 25 kPa or less was evaluated as acceptable because of excellent protective properties, and the symbol "Good" is shown in the "Evaluation" column. In addition, a case where the value of $\sigma_5$ was more than more than 25 kPa was evaluated as unacceptable because of poor protective properties, and the symbol "Poor" is shown in the "Evaluation" column.

<Texture>

The texture was evaluated by a sensory test. Specifically, 10 persons skilled in the art were used as panels, and evaluated whether or not the skin surface of the expanded beads molded article had a moist texture by touching the skin surface of the expanded beads molded article with hands in a blind state. When 8 or more persons out of the 10 persons as the panels evaluated that the expanded beads molded article had a moist tactile sensation, it was determined that the skin surface of the expanded beads molded article had a texture gentle to the object to be packaged, and the symbol "Good" is shown in the "Evaluation" column. When 2 or less persons out of the 10 persons as the panels evaluated that the expanded beads molded article had a moist tactile sensation, it was determined that the skin surface of the expanded beads molded article had no texture gentle to the object to be packaged, and the symbol "Poor" is shown in the "Evaluation" column. In the sensory test on the texture, an expanded beads molded article after being allowed to stand for 24 hours in an environment of a temperature of 23° C. and a relative humidity of 50% RH was used.

<Evaluation of Rigidity>

In the evaluation of the rigidity, a case where a value of a product $X \cdot \sigma_{50}$ of the 50% compressive stress $\sigma_{50}$ and the molded article magnification X was 6500 or more was evaluated as acceptable because of excellent balance between the rigidity and the lightness in weight, and the symbol "Good" is shown in the "Evaluation" column. A case where the value of the product $X \cdot \sigma_{50}$ of the 50% compressive stress $\sigma_{50}$ and the molded article magnification X was less than 6500 was evaluated as unacceptable because of poor balance between the rigidity and the lightness in weight, and the symbol "Poor" is shown in the "Evaluation" column.

(Evaluation of Molding Possible Range)

An expanded beads molded article was molded in the same manner as in the method for producing an expanded beads molded article described above, except that a steam pressure was changed at intervals of 0.02 MPa (G) between 0.18 to 0.40 MPa (G). Using the obtained molded article, the internal fusion-bonding rate, secondary expandability, and recoverability were evaluated in the same manners as described above. Then, the steam pressure at which all the three items were acceptable was determined to be capable of molding the expanded beads molded article. The "Molding possible range" column of Table 2 shows the range of the steam pressure at which the expanded beads molded article could be molded.

TABLE 1

| Resin Symbol | Material | Catalyst | Comonomer | Flexural Modulus (MPa) | Melting Point (° C.) | Density (kg/m³) | MFR (g/10 min) | Degree of Polydispersion Mw/Mn |
|---|---|---|---|---|---|---|---|---|
| PP1 | r-PP | Ziegler-Natta | Ethylene 3.1 mass % | 967 | 141 | 900 | 7.1 | 5.4 |
| PP2 | r-PP | Ziegler-Natta | Ethylene 2.7 mass % | 975 | 142 | 900 | 6.6 | 4.2 |
| PP3 | PP | Ziegler-Natta | Ethylene 3.1 mass %<br>Butene 3.8 mass % | 650 | 131 | 895 | 6.0 | Not measured |
| PE1 | LLDPE | Metallocene | Not measured | 110 | 100 | 906 | 10.0 | — |
| PE2 | LLDPE | Ziegler-Natta | Not measured | 275 | 123 | 925 | 2.3 | — |

TABLE 2

| | | | Unit | Expanded Bead A | Expanded Bead B | Expanded Bead C | Expanded Bead D |
|---|---|---|---|---|---|---|---|
| Resin Bead | Core Layer | Resin Symbol | — | PP1 | PP2 | PP2 | PP1 |
| | | Flexural Modulus Mc | MPa | 967 | 975 | 975 | 967 |
| | Covering Layer | Resin Symbol | — | PE1 | PE1 | PE1 | PE1 |
| | | Flexural Modulus Ms | MPa | 110 | 110 | 110 | 110 |
| | | Ratio of Covering Layer in Bead | mass % | 10 | 10 | 10 | 15 |
| | Ratio of Flexural Modulus Ms/Mc | | — | 0.11 | 0.11 | 0.11 | 0.11 |
| | Mass of Resin Bead | | mg | 1.0 | 2.0 | 2.0 | 1.0 |
| First Expanding Step | Expanding Temperature | | ° C. | 146.8 | 147.2 | 146.4 | 147.5 |
| | Pressure in Sealed Container | | MPa(G) | 3.10 | 3.05 | 3.70 | 3.00 |
| First-step Expanded Bead | Bulk Density Immediately after Expanding ρ(A) | | kg/m³ | 41.9 | 42.1 | 31.0 | 43.5 |
| | Bulk Density after Curing ρ(B) | | kg/m³ | 32.1 | 33.3 | 25.7 | 34.0 |
| | Bulk Ratio (I) | | times | 28.0 | 27.0 | 35.0 | 26.5 |
| Second Expanding Step | Pressure in Cell | | MPa(G) | 0.47 | 0.49 | 0.47 | 0.38 |
| | Pressure of Steam during Heating | | MPa(G) | 0.10 | 0.20 | 0.20 | 0.20 |
| Expanded Bead | Mass of Expanded Bead | | mg | 1.0 | 2.0 | 2.0 | 1.0 |
| | Bulk Density ρ(C) | | kg/m³ | 12.5 | 13.0 | 13.3 | 19.0 |
| | Bulk Ratio (II) | | times | 72.0 | 69.2 | 67.7 | 47.4 |
| | Average Bead Diameter | | mm | 4.2 | 5.2 | 5.1 | 3.6 |
| | Coefficient of Variation in Bead Diameter | | % | 7.8 | 8.8 | 8.6 | 10.6 |
| | Ratio of Bulk Density ρ(C)/ρ(A) | | — | 0.30 | 0.31 | 0.43 | 0.44 |
| | Ratio of Bulk Density ρ(C)/ρ(B) | | — | 0.39 | 0.39 | 0.52 | 0.56 |
| | Ratio of Bulk Ratio (II)/(I) | | — | 2.57 | 2.56 | 1.93 | 1.79 |
| | Closed Cell Content | | % | 97 | 97 | 96 | 98 |
| | Heat of High Temperature Peak | | J/g | 11.7 | 12.1 | 11.9 | 12.6 |
| | Average Cell Diameter D in Entire Expanded Bead | | μm | 144 | 139 | 137 | 101 |
| | Average Cell Diameter Ds in Surface Layer Part | | μm | 130 | 145 | 131 | 98 |

TABLE 2-continued

| | | | | | | | |
|---|---|---|---|---|---|---|---|
| | Ratio of Cell Diameter Ds/D | | — | 0.90 | 1.04 | 0.96 | 0.97 |
| | Molding Possible Range | | MPa(G) | 0.26-0.28 | 0.26-0.28 | 0.26-0.28 | 0.28-0.30 |

| | | | Expanded Bead E | Expanded Bead F | Expanded Bead G | Expanded Bead H |
|---|---|---|---|---|---|---|
| Resin Bead | Core Layer | Resin Symbol | PP2 | PP1 | PP1 | PE2 |
| | | Flexural Modulus Mc | 975 | 967 | 967 | 275 |
| | Covering Layer | Resin Symbol | PP3 | PE2 | PE1 | — |
| | | Flexural Modulus Ms | 650 | 275 | 110 | — |
| | | Ratio of Covering Layer in Bead | 3 | 10 | 3 | — |
| | Ratio of Flexural Modulus Ms/Mc | | 0.67 | 0.28 | 0.11 | — |
| | Mass of Resin Bead | | 1.0 | 1.0 | 1.0 | 2.5 |
| First Expanding Step | Expanding Temperature | | 148.7 | 146.8 | 147.0 | 123.7 |
| | Pressure in Sealed Container | | 2.18 | 3.10 | 3.10 | 3.70 |
| First-step Expanded Bead | Bulk Density Immediately after Expanding ρ(A) | | 41.1 | 42.0 | 39.0 | 47.4 |
| | Bulk Density after Curing ρ(B) | | 40.9 | 32.8 | 33.7 | 46.1 |
| | Bulk Ratio (I) | | 22.0 | 27.4 | 26.7 | 19.5 |
| Second Expanding Step | Pressure in Cell | | 0.43 | 0.49 | 0.50 | 0.38 |
| | Pressure of Steam during Heating | | 0.26 | 0.16 | 0.14 | 0.12 |
| Expanded Bead | Mass of Expanded Bead | | 1.0 | 1.0 | 1.0 | 2.5 |
| | Bulk Density ρ(C) | | 12.1 | 12.5 | 12.4 | 19.6 |
| | Bulk Ratio (II) | | 74.4 | 72.0 | 72.6 | 45.9 |
| | Average Bead Diameter | | 4.4 | 4.3 | 4.3 | 4.9 |
| | Coefficient of Variation in Bead Diameter | | 11.1 | 8.1 | 8.6 | 10.4 |
| | Ratio of Bulk Density ρ(C)/ρ(A) | | 0.29 | 0.30 | 0.32 | 0.41 |
| | Ratio of Bulk Density ρ(C)/ρ(B) | | 0.30 | 0.38 | 0.37 | 0.43 |
| | Ratio of Bulk Ratio (II)/(I) | | 3.38 | 2.62 | 2.72 | 2.35 |
| | Closed Cell Content | | 95 | 97 | 96 | 97 |
| | Heat of High Temperature Peak | | 13.4 | 11.5 | 11.8 | 29.1 |
| | Average Cell Diameter D in Entire Expanded Bead | | 173 | 141 | 137 | 151 |
| | Average Cell Diameter Ds in Surface Layer Part | | 124 | 145 | 131 | 166 |
| | Ratio of Cell Diameter Ds/D | | 0.72 | 1.03 | 0.96 | 1.10 |
| | Molding Possible Range | | 0.28-0.30 | 0.28-0.30 | 0.28-0.30 | 0.12-0.14 |

TABLE 3

| | | | Unit | Example 1 | Example 2 | Example 3 | Example 4 |
|---|---|---|---|---|---|---|---|
| Expanded Bead | Expanded Bead Symbol | | — | Expanded Bead A | Expanded Bead A | Expanded Bead B | Expanded Bead C |
| | Bulk Density ρ(C) | | $kg/m^3$ | 12.5 | 12.5 | 13.0 | 13.3 |
| Molding Conditions | Volume of Cracking Gap | | % | 10 | 10 | 10 | 10 |
| | Surface Pressure | | MPa(G) | 0.079 | 0.079 | 0.076 | 0.082 |
| | Molding Pressure | | MPa(G) | 0.26 | 0.28 | 0.26 | 0.26 |
| | Main Heating Time | | second | 2 | 2 | 2 | 2 |
| Expanded Beads Molded Article | Molded Article Density ρ(D) | | $kg/m^3$ | 14.4 | 14.4 | 13.2 | 14.6 |
| | Molded Article Magnification X | | times | 62.5 | 62.5 | 68.2 | 61.6 |
| | Apparent Density ρ(E) in Surface Layer Part | | $kg/m^3$ | 21.5 | 22.0 | 19.3 | 19.8 |
| | ρ(E)/ρ(D) | | — | 1.49 | 1.53 | 1.46 | 1.36 |
| | Average Cell Diamete di in Inner Part | | μm | 147 | 147 | 137 | 137 |
| | Average Cell Diameter ds in Surface Layer Part | | μm | 158 | 158 | 147 | 147 |
| | Ratio of Cell Diamete $d_s/d_i$ | | — | 1.08 | 1.08 | 1.07 | 1.07 |
| | In-mold Moldability | Internal Fusion Rate | % | 95 | 95 | 95 | 95 |
| | | Secondary Expandability | — | A | A | A | A |
| | | Recoverability | — | A | A | A | A |
| | Shrinkage Percentage of Molded Article | | % | 3.3 | 3.3 | 2.8 | 2.8 |
| | Surface Hardness | | — | 29.4 | 29.0 | 28.0 | 28.4 |
| | Lightness in Weight | Evaluation | — | Good | Good | Good | Good |
| | Protective Properties | 5% Compressive Stress $\sigma_5$ | kPa | 24.1 | 21.4 | 22.1 | 23.2 |
| | | 50% Compressive Stress $\sigma_{50}$ | kPa | 123.3 | 122.5 | 116.7 | 119.8 |
| | | Ratio of Compressive Stress $\sigma_5/\sigma_{50}$ | — | 0.20 | 0.17 | 0.19 | 0.19 |
| | | Evaluation | — | Good | Good | Good | Good |
| | Texture | | — | Good | Good | Good | Good |
| | Rigidity | $\sigma_5/\rho(D)$ | — | 8.6 | 8.5 | 8.8 | 8.2 |
| | | $X \cdot \sigma_{50}$ | — | 7708 | 7655 | 7959 | 7387 |
| | | Evaluation | — | Good | Good | Good | Good |

TABLE 4

| | | | Unit | Comparative Example 1 | Comparative Example 2 | Comparative Example 3 | Comparative Example 4 | Reference Example 1 |
|---|---|---|---|---|---|---|---|---|
| Expanded Bead | Expanded Bead Symbol | | — | Expanded Bead D | Expanded Bead E | Expanded Bead F | Expanded Bead G | Expanded Bead H |
| | Bulk Density ρ © | | kg/m³ | 19.0 | 12.1 | 12.5 | 12.4 | 22.7 |
| Molding Conditions | Volume of Cracking Gap | | % | 10 | 10 | 10 | 10 | 10 |
| | Surface Pressure | | MPa(G) | 0.088 | 0.078 | 0.079 | 0.085 | 0.036 |
| | Molding Pressure | | MPa(G) | 0.28 | 0.28 | 0.28 | 0.28 | 0.12 |
| | Main Heating Time | | second | 2 | 2 | 2 | 2 | 5 |
| Expanded Beads Molded Article | Molded Article Density ρ(D) | | kg/m³ | 20.0 | 12.8 | 14.3 | 13.4 | 21.9 |
| | Molded Article Magnification X | | times | 45.0 | 70.3 | 62.9 | 67.2 | 41.1 |
| | Apparent Density ρ(E) in Surface Layer Part | | kg/m³ | 25.4 | 22.9 | 21.8 | 20.9 | 33.4 |
| | ρ(E)/ρ(D) | | — | 1.27 | 1.79 | 1.53 | 1.56 | 1.52 |
| | Average Cell Diamete di in Inner Part | | μm | 114 | 172 | 147 | 137 | 158 |
| | Average Cell Diameter ds in Surface Layer Part | | μm | 129 | 205 | 158 | 158 | 158 |
| | Ratio of Cell Diamete ds/di | | — | 1.13 | 1.20 | 1.08 | 1.15 | 1.00 |
| | In-mold Moldability | Internal Fusion Rate | % | 95 | 95 | 95 | 95 | 95 |
| | | Secondary Expandability | — | A | A | A | A | A |
| | | Recoverability | — | A | A | A | A | A |
| | Shrinkage Percentage of Molded Article | | % | 2.9 | 2.3 | 3.3 | 3.3 | 2.3 |
| | Surface Hardness | | — | 37.0 | 32.6 | 31.0 | 30.0 | 32.0 |
| | Lightness in Weight | Evaluation | — | Poor | Good | Good | Good | Poor |
| | Protective Properties | Evaluation | kPa | 48.9 | 29.1 | 28.5 | 27.0 | 24.5 |
| | | 50% Compressive Stress σ50 | kPa | 153.3 | 126.5 | 123.5 | 125.1 | 110.5 |
| | | Ratio of Compressive Stress σ5/σ50 | — | 0.32 | 0.23 | 0.23 | 0.22 | 0.22 |
| | | Evaluation | — | Poor | Poor | Poor | Poor | Good |
| | Texture | | — | Good | Poor | Poor | Poor | Good |
| | Rigidity | $\sigma_{50}/\rho(D)$ | — | 7.7 | 9.9 | 8.6 | 9.3 | 5.0 |
| | | $X \cdot \sigma_{50}$ | — | 6899 | 8895 | 7773 | 8402 | 4541 |
| | | Evaluation | — | Good | Good | Good | Good | Poor |

As shown in Table 3, in the expanded bead molded articles of Examples 1 to 4, the molded article magnification X, the value of the product $X \cdot \sigma_{50}$ of the 50% compressive stress $\sigma_{50}$ and the molded article magnification X, and the 5% compressive stress $\sigma_5$ fall within the above-described specific ranges. Therefore, these expanded bead molded articles have excellent rigidity and protective properties, and can have a reduced mass per unit volume. The skin surface of these expanded bead molded articles have a texture gentle to the object to be packaged, like a polyethylene-based resin expanded beads molded article. In addition, the value of surface hardness on the skin surface of the expanded beads molded article is small, and excellent protective properties are obtained.

As shown in Table 4, the expanded beads molded article of Comparative Example 1 was in-mold molded using the expanded beads D having a lower bulk ratio (II) than those of Examples 1 to 4. Therefore, the expanded beads molded article of Comparative Example 1 has a molded article magnification X lower than those of Examples 1 to 4, and is inferior thereto in lightness in weight and protective properties for the object to be packaged.

The expanded beads molded article of Comparative Example 2 was in-mold molded using the expanded beads E in which both the core layer and the covering layer were composed of a polypropylene-based resin. Therefore, the expanded beads molded article of Comparative Example 2 has a 5% compressive stress $\sigma_5$ larger than those of Examples 1 to 4, and is inferior thereto in protective properties. The expanded beads molded article of Comparative Example 2 is inferior in texture.

In the expanded beads molded article of Comparative Example 2, although the molded article magnification X was higher than those of Examples 1 to 4, Comparative Examples 3 and 4, and Reference Example 1, the 5% compressive stress $\sigma_5$ was particularly large. The reason for this is considered to be that the covering layer is composed of a polypropylene-based resin, additionally, the average cell diameter $d_i$ in the inner part of the expanded beads molded article is large, and the ratio $d_s/d_i$ of the average cell diameter $d_s$ [μm] in the surface layer part of the expanded beads molded article to the average cell diameter $d_i$ is large. The reason why the expanded beads molded article of Comparative Example 2 had such a cell structure is considered to be that, since the average cell diameter D of the entire beads of the expanded beads E was large and the ratio Ds/D of the average cell diameter Ds in the surface layer part to the average cell diameter D was small, the cells located in the surface layer part were pressed and flattened by secondary expanding of the cells inside during in-mold molding.

The expanded beads molded article of Comparative Example 3 was in-mold molded using the expanded beads F including a covering layer made of a polyethylene-based resin having a flexural modulus Ms higher than those of Examples 1 to 4. Therefore, the expanded beads molded article of Comparative Example 3 has a 5% compressive stress as larger than those of Examples 1 to 4, and is inferior thereto in protective properties. The expanded beads molded article of Comparative Example 3 is inferior in texture.

Since the expanded beads molded article of Comparative Example 4 was in-mold molded using the expanded beads G having a smaller ratio of the covering layer than those of Examples 1 to 4, the effect of the covering layer cannot be sufficiently obtained. Therefore, the expanded beads molded article of Comparative Example 4 has a 5% compressive stress $\sigma_5$ larger than those of Examples 1 to 4, and is inferior thereto in protective properties. The expanded beads molded article of Comparative Example 4 is inferior in texture.

Reference Example 1 is an expanded bead molded article obtained by in-mold molding the polyethylene-based resin expanded beads H. The expanded beads molded article of Reference Example 1 has a small value of the 5% compressive stress $\sigma_5$ and is excellent in protective properties, but has a small value of the product $X \cdot \sigma_{50}$ of the 50% compressive stress $\sigma_{50}$ [kPa] and the molded article magnification X, and cannot satisfy the rigidity required for packaging materials and cushioning materials depending on the application.

The invention claimed is:

1. A polypropylene-based resin expanded bead comprising:
 a core layer, in a foamed state, comprising a polypropylene-based resin; and
 a covering layer, which covers the core layer, comprising a polyethylene-based resin,
 wherein
 a bulk ratio is 55 times to 90 times,
 a mass ratio between the core layer and the covering layer is 95:5 to 88:12,
 a flexural modulus Mc of the polypropylene-based resin contained in the core layer is 800 MPa to 1200 MPa, and
 a flexural modulus Ms of the polyethylene-based resin contained in the covering layer is 250 MPa or less.

2. The expanded bead according to claim 1, wherein an average cell diameter D of the entire expanded bead is 80 μm to 170 μm, and a ratio DS/D of an average cell diameter DS [μm] in a surface layer part of the expanded bead to the average cell diameter D of the entire expanded bead is 0.80 to 1.20.

3. The expanded bead according to claim 1, wherein a closed cell content of the expanded bead is 85% or more.

4. The expanded bead according to claim 1, wherein an average bead diameter of the expanded bead is 2 mm to 8 mm, and a coefficient of variation in the bead diameter is 3% to 15%.

5. The expanded bead according to claim 1, wherein a ratio Ms/Mc of the flexural modulus Ms of the polyethylene-based resin contained in the covering layer to the flexural modulus Mc of the polypropylene-based resin contained in the core layer is 0.05 to 0.20.

6. The expanded bead according to claim 1, wherein the polyethylene-based resin contained in the covering layer has the flexural modulus Ms of 200 MPa or less and a melting point of 120° C. or lower.

7. The expanded bead according to claim 1, wherein a melt flow rate of the polyethylene-based resin contained in the covering layer is 6 g/10 min to 18 g/10 min at a temperature of 190° C. and a load of 2.16 kg.

8. The expanded bead according to claim 1, wherein a melting point of the polypropylene-based resin contained in the core layer is 135° C. to 150° C.

9. A method for producing a polypropylene-based resin expanded bead, comprising:
 a granulating step of forming a polypropylene-based resin bead comprising:
  a core layer, in a non-foamed state, comprising a polypropylene-based resin having a flexural modulus Mc of 800 MPa to 1200 MPa; and
  a covering layer, which covers the core layer, comprising a polyethylene-based resin having a flexural modulus Ms of 250 MPa or less, wherein a mass ratio between the core layer and the covering layer is 95:5 to 88:12;
 a first expanding step of impregnating the polypropylene-based resin bead dispersed in a dispersion medium in a sealed container with an inorganic physical blowing agent, and then releasing the polypropylene-based resin bead and the dispersion medium from the sealed container to a pressure lower than that in the sealed container, thereby obtaining a first-step expanded bead comprising:
  a core layer, in a foamed state, comprising the polypropylene-based resin; and
  a covering layer, which covers the core layer, comprising the polyethylene-based resin; and
 a second expanding step of impregnating the first-step expanded bead with an inorganic gas in a pressure-resistant container to increase a pressure in cells of the first-step expanded bead, and then heating the first-step expanded bead taken out from the pressure-resistant container under a pressure lower than that in the cells to further expand the first-step expanded bead, thereby obtaining a polypropylene-based resin expanded bead having a bulk ratio (II) of 55 times to 90 times.

10. The method according to claim 9, wherein in the first expanding step, the polypropylene-based resin bead is impregnated with carbon dioxide as the inorganic physical blowing agent.

11. The method according to claim 9, wherein
 in the first expanding step, the first-step expanded bead having a bulk ratio (I) of 25 times to 38 times, and
 in the second expanding step, the first-step expanded bead is expanded so that a value of a ratio (II)/(I) of the bulk ratio (II) to the bulk ratio (I) of the expanded bead is 1.8 to 3.0.

12. A molded article of polypropylene-based resin expanded beads, wherein
 the molded article is obtained by in-mold molding of the polypropylene-based resin expanded beads according to claim 1,
 wherein,
 a molded article magnification X [times] of the molded article is 55 times to 90 times,
 a value of a product $X \cdot \sigma_{50}$ of a 50% compressive stress $\sigma_{50}$ [kPa] and the molded article magnification X in the molded article is 6500 or more, and
 a 5% compressive stress $\sigma_5$ of the molded article is 5 kPa to 25 kPa.

13. The molded article according to claim 12, wherein a value of a ratio $\sigma_5/\sigma_{50}$ of the 5% compressive stress $\sigma_5$ of the molded article to the 50% compressive stress $\sigma_{50}$ is 0.20 or less.

14. The molded article according to claim 12, wherein an average cell diameter $d_i$ in an inner part of the molded article is 80 μm to 170 μm, and a ratio $d_s/d_i$ of an average cell diameter $d_s$ [μm] in a surface layer part of the molded article to the average cell diameter $d_i$ is 0.8 to 1.2.

* * * * *